(12) United States Patent
Faye et al.

(10) Patent No.: US 11,579,630 B2
(45) Date of Patent: Feb. 14, 2023

(54) DECENTRALIZED ROBOT COOPERATION PLATFORM

(71) Applicant: Accenture Global Solutions Limited, Dublin (IE)

(72) Inventors: Abdoulaye Faye, Antibes (FR); Hugo Borne-Pons, Antibes (FR)

(73) Assignee: Accenture Global Solutions Limited, Dublin (IE)

( * ) Notice: Subject to any disclaimer, the term of this patent is extended or adjusted under 35 U.S.C. 154(b) by 458 days.

(21) Appl. No.: 16/784,139

(22) Filed: Feb. 6, 2020

(65) Prior Publication Data

US 2021/0247776 A1 Aug. 12, 2021

(51) Int. Cl.
| G05D 1/02 | (2020.01) |
| H04L 9/06 | (2006.01) |
| G06Q 10/0631 | (2023.01) |
| H04L 9/00 | (2022.01) |

(52) U.S. Cl.
CPC ..... G05D 1/0291 (2013.01); G06Q 10/06311 (2013.01); H04L 9/0643 (2013.01); H04L 9/50 (2022.05)

(58) Field of Classification Search
CPC ............ G05D 1/0291; G06Q 10/06311; H04L 9/0643; H04L 9/50
See application file for complete search history.

(56) References Cited

U.S. PATENT DOCUMENTS

2017/0050321 A1* 2/2017 Look ................. G06Q 10/06398
2019/0373472 A1* 12/2019 Smith ..................... H04W 4/38

FOREIGN PATENT DOCUMENTS

| CN | 111371559 A | * | 7/2020 | ........... G06Q 10/087 |
| WO | WO-2019081086 A1 | * | 5/2019 | ............. G06F 16/00 |

* cited by examiner

Primary Examiner — Samina F Choudhry
(74) Attorney, Agent, or Firm — Norton Rose Fulbright US LLP

(57) ABSTRACT

Systems and methods of the present disclosure leverage distributed ledger technology (DLT) to provide decentralized control of cooperative tasks performed by a plurality of robots. Characteristics of the plurality of robots may be stored in a distribute ledger, which may be provided by a blockchain or a distributed database system. When a service request is received, a set of tasks may be identified for providing the requested service and the robot characteristics recorded to the distributed ledger may be used to identify a list of candidate robots possessing characteristics corresponding to the set of tasks may be identified. A smart contract may be utilized to select one or more candidate robots for performing the task and to verify the selected robot(s) successfully completed the task. State information associated with operation of the selected robot(s) may be monitored to verify task completion.

20 Claims, 6 Drawing Sheets

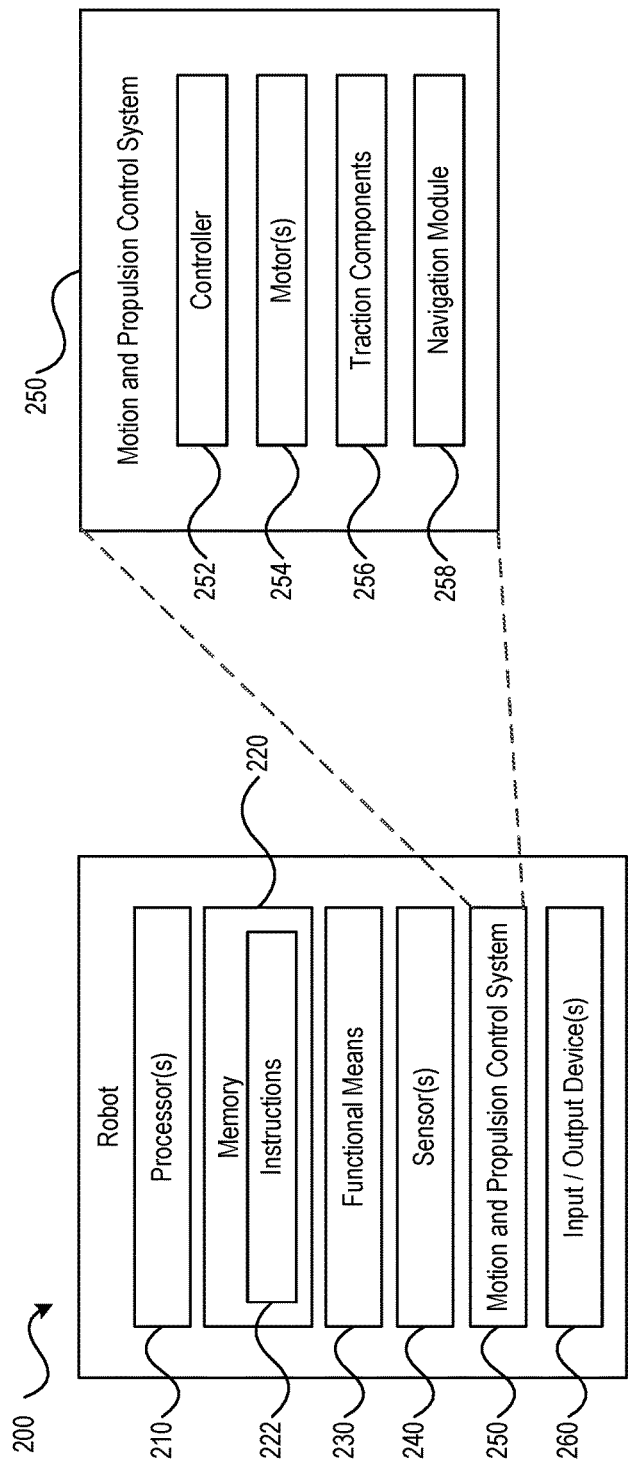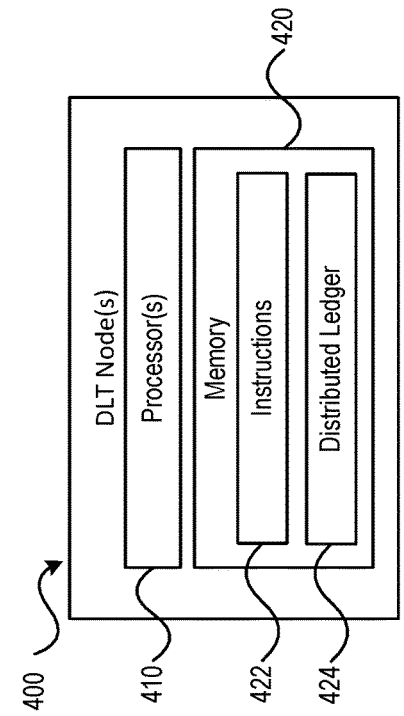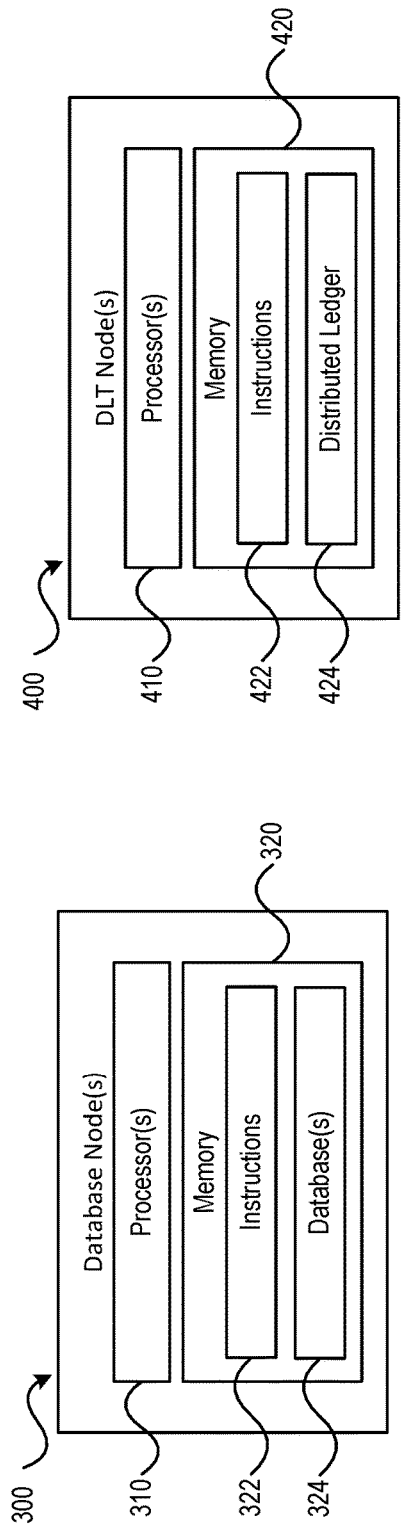

DECENTRALIZED ROBOT COOPERATION PLATFORM

TECHNICAL FIELD

The present application relates to robotic control systems and more specifically to a decentralized system that leverages distributed ledger technology to control performance of tasks by a plurality of robots in a coordinated manner.

BACKGROUND

As robot technology has advanced more and more entities are seeking ways to leverage the benefits of robots and robotic capabilities to improve how various tasks are performed. As one example, robots are increasingly used in manufacturing processes, where robots may be deployed to replace assembly line workers. In such use cases, the robots may be programmed to perform repetitive tasks, such as adding and securing a part to a vehicle. Robots have found widespread use for these types of use cases as robots may be programmed to perform repetitive tasks quickly and efficiently while providing a lower cost to operate over time as compared to cost of employing a human to perform the same repetitive task. However, there is demand for systems that can deploy robots in scenarios where the task or tasks to be performed involve more than mere repetition of movement. For example, some grocery stores are deploying robots to perform various tasks in a retail store environment, such as monitoring stock of items for sale to detect low or out of stock items, detect and report spills, debris, or other hazards within the aisles of the retail store, and in some cases even stock the shelves.

One challenge that robotic deployments face is how control over the various robots is provided. Typically, robotic deployments have utilized a centralized control mechanism, where each of the robots is controlled from a central server. In such an arrangement, the central server may communicate with each robot individually but the robots do not communicate with themselves. For example, a robot deployed in a grocery store may detect that a spill has occurred at a particular location (e.g., one of the aisles of the grocery store) and communicate the location of the spill to the central server. The central server, upon receiving information regarding the spill from the robot, may notify an employee of the location of the spill so that the employee may clean up the spill or, if a robot having capabilities for cleaning spills is present, the central server may instruct the cleaning robot to clean up the spill.

While a centralized system, such as a system for monitoring various aspects of a grocery store, may be suitable for many use cases, there are many use cases where centralized systems would not be sufficient and would actually inhibit the ability of the robots to achieve their programmed tasks. For example, in a hospital setting there are many different departments (e.g., anaesthesiology, cardiology, pharmacy, patient intake, etc.). While all of these different departments may be present at a single hospital, they may be at least partially controlled by different entities (e.g., the hospital may contract with certain doctors to provide services at the hospital and each group of contracted doctors may be a separate entity or contractor). In such instances, it may be difficult to provide centralized control of the various tools or machines, which may include robots (e.g., a motorized x-ray machine robot, etc.), used by the contracting entities because each entity wants to maintain control over the tools and machines they utilize to provide their respective services at the hospital. Furthermore, some of the tools and machines present at the hospital may be rented or leased by the associated physicians and the company that is renting or leasing the tools or machines to the doctors may not want the hospital to have complete control over the tools and machines. In complex environments where multiple parties are involved, a centralized control scheme may not provide a workable solution for controlling the robots that each party utilizes.

Another drawback of centralized control is that such systems have a single point of failure (e.g., the central server), which can lead to undesired consequences, especially if utilized in a hospital setting where a failure may prevent robots providing life-saving functionality from being deployed in a timely fashion. Additionally, due to the centralized control and lack of communication between robots, two robots that perform substantially the same task may not be able to learn from the experiences of each other. To illustrate, when a first robot experiences a failure, the failure may be reported to the centralized server but a second robot that performs similar functions as the first robot may not be made aware of the failure and cannot aid in responding to the failure, such as by performing or completing the task for the first robot or training the robot to operate in a different manner to mitigate the failure (e.g., if a robot having 6 legs experiences a failure with one of the legs, it cannot be provided with information from another robot that instructs the robot how to move with only 4 legs). Thus, existing systems for providing centralized control over robot deployments suffer from several disadvantages. It is noted that the drawbacks described above have been provided for purposes of illustration only and that other disadvantages and drawbacks may also be present depending on the particular use case in which the control over robots is being deployed.

SUMMARY

The present application is directed to systems, methods, and computer-readable storage media configured to leverage distributed ledger technology (DLT) to provide decentralized control over robots owned by different entities. In embodiments, a plurality of DLT clients (e.g., processes running in a distributed server or cloud-based environment) may be provided and each of the DLT clients may be associated with one or more robots. The DLT clients may include functionality for receiving a service request from a requestor device (e.g., a physician requesting an x-ray of a patient's arm and providing pain medication to the patient) and translating the service request into one or more tasks that may be performed by a plurality of robots. A public database may be provided to translate a service request into one or more tasks and/or identify robotic characteristics or capabilities that may be needed in order for a robot to perform the one or more tasks.

The DLT client may provide at least a portion of the information determined from the service request to a DLT node, which may identify a list of candidate robots to assist in performing the tasks associated with the service request. A challenge may be issued to each of the candidate robots (or a DLT client associated with each of the candidate robots) and any robots interested in assisting with the performance of the task(s) may calculate a proof of computation based on the challenge and provide the proof of computation to the DLT node. The DLT node may select one of the candidate robots from among those candidate robots for which a proof of computation was received and notify the selected robot of the task for which it was selected.

Based on the selection, the robot may perform the task at an appropriate time. For example, if the task is dependent on one or more previous tasks being completed, the robot may monitor other robots using state information recorded to a distributed ledger to determine when the previous tasks have been completed and then may initiate operations to perform the task for which the robot was selected. To provide verification of the performance of the task, one or more witness nodes may be selected by the DLT node and the one or more witnesses may monitor state information associated with the selected robot to determine whether the selected robot has successfully completed its task. Information regarding whether the selected robot successfully completed the task may be provided to the DLT node (e.g., for recording on a distributed ledger provided via a distributed database system, public or private blockchain, or both a distributed database system and a public or private blockchain).

As will be apparent from the detailed description below, the systems and methods disclosed herein provide a secure, modular and decentralized robot collaboration and cooperation platform. The disclosed solutions enhance a robot's initial capabilities by leveraging the support from other robots through a decentralized and secure platform. The modular architecture allows different problems found in the existing robot-to-robot communication systems to be overcome and leverages DLT extend the potential of robot-to-robot interactions by bringing decentralization, security and trust. Due to its decentralized nature, the disclosed systems and methods may also experience reduced failures, as a single robot or node failure will not cause a complete system failure and the remaining robots and nodes may continue operating.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein:

FIG. 2 is a block diagram of a robot in accordance with embodiments of the present disclosure;

FIG. 3 is a block diagram of a database node in accordance with embodiments of the present disclosure;

FIG. 4 is a block diagram of a DLT node in accordance with embodiments of the present disclosure;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
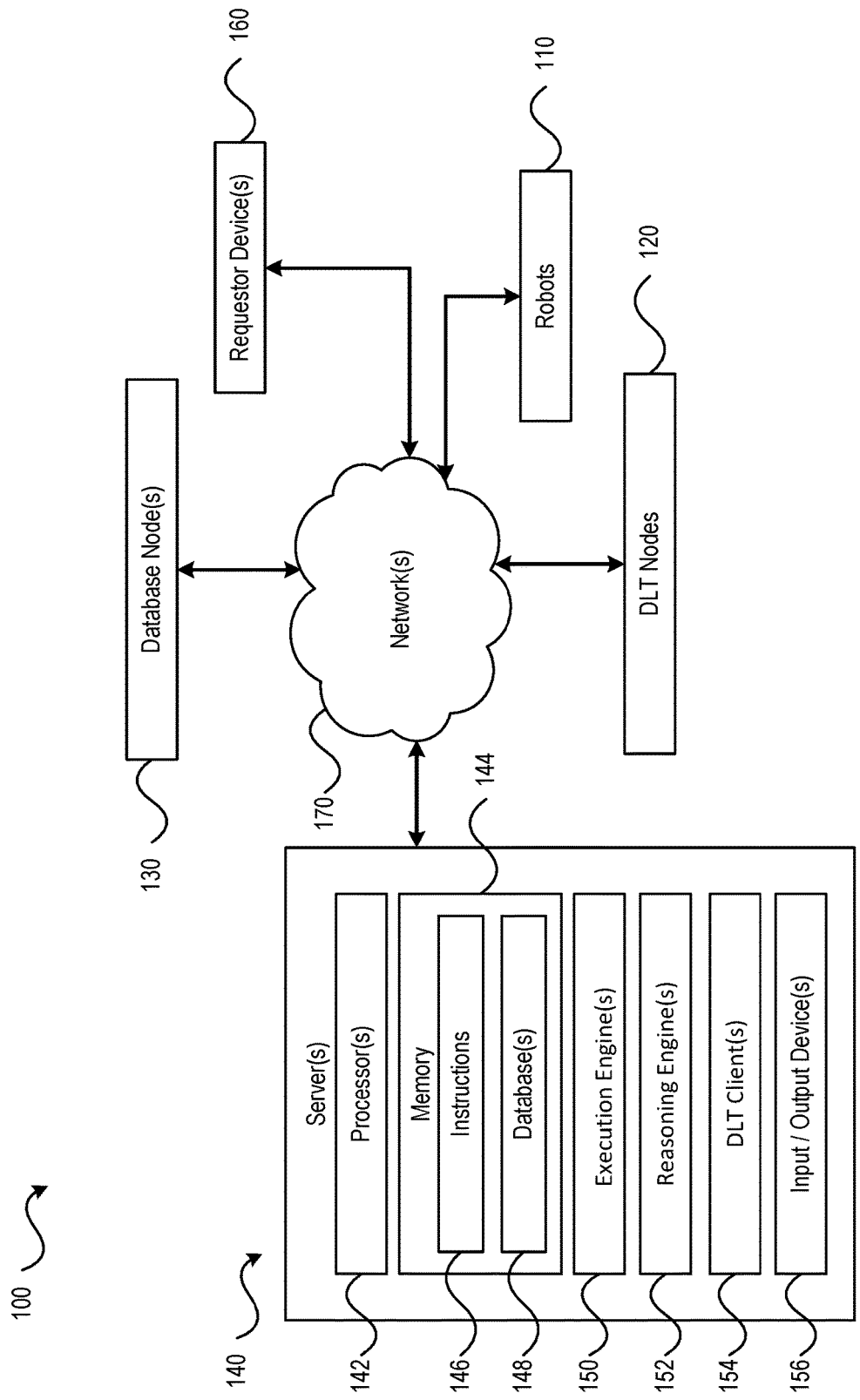
FIG. 1 is a block diagram of a system providing decentralized control of robotic agents in accordance with embodiments of the present disclosure.

Referring to FIG. 1, a block diagram of a system providing decentralized control of robotic agents in accordance with embodiments of the present disclosure is shown as a system 100. As shown in FIG. 1, the system 100 may include one or more robots 110, one or more DLT nodes 120, one or more database nodes 130, one or more servers 140, and one or more requestor devices 160. As described in detail herein with reference to FIGS. 1-8, operations of the system 100 may provide functionality that enables decentralized control of robots. For example, a service may be requested by one of the requestor devices 160 and operation of the system 100 may facilitate selection of one or more robots having characteristics suitable for performing one or more tasks corresponding to the requested service. As described in more detail below, the selection of the one or more robots may be performed based on information stored at the one or more database nodes 130, such as information that translates a requested service into a set of tasks or sub-tasks and information that identifies capabilities needed by the robots selected for performing the set of tasks or sub-tasks. In aspects, the DLT nodes 120 may provide functionality for managing interactions and coordination between different robots to oversee provisioning of requested services and for verification that the requested services are performed successfully, as described in more detail below with reference to FIGS. 5-7.

Referring briefly to FIG. 2, a block diagram of a robot configured to operate in accordance with embodiments of the present disclosure is shown as a robot 200. The robot 200 illustrates exemplary aspects of the one or more robots 110 of FIG. 1 and may be operated within a system (e.g., the system 100 of FIG. 1) to provide functionality for providing at least a portion of one or more requested services. As shown in FIG. 2, the robot 200 may include one or more processors 210, a memory 220, functional means 230, one or more sensors 240, a motion and propulsion control system 250, and one or more input/output (I/O) devices 260. The one or more processors 210 may include one or more microcontrollers, application specific integrated circuits (ASICs), field programmable gate arrays (FPGAs), central processing units (CPUs) having one or more processing cores, or other circuitry and logic configured to facilitate the operations of the robot 200 in accordance with aspects of the present disclosure. The memory 220 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, or other memory devices configured to store data in a persistent or non-persistent state. Software configured to facilitate operations and functionality of the robot 200 may be stored in the memory as instructions 222 that, when executed by the one or more processors 210, cause the one or more processors to perform the operations described herein with respect to the robot 200, as described in more detail below. Although not illustrated in FIG. 2 for simplicity of the drawing, AGVs of embodiments may include a power source, such as one or more batteries, configured to provide operational power to the robot 200.

The one or more functional means 230 may include a robotic arm that may be moved within a predetermined range of motion in 3D space, such as to raise and lower the robotic arm up and down, extend the arm in front of or behind the robot, or other types of movements. Additionally, the one or more functional means 230 may include a gripping means, such as a robotic hand or pincers that may grasp an item or other types of mechanisms that may be used to transport items. For example, the robot 200 may be deployed in a warehouse and may be configured to pick up an item (e.g., a box, a palette of boxes, etc.) from a first location and deliver the item to a second location and the gripping means may be used to pick up and hold the item during transport. As another example, the functional means 230 may include a medication dispenser configured to dispense one or more medications to patients in a hospital. The functional means 230 may also include a latch mechanism that may be used to tow items or other robots. The functional means 230 may include other types of devices, such as an x-ray machine, a camera (e.g., for surveying applications), and the like depending on the particular environment in which the robot 200 is operating and the types of services and tasks the robots may be requested to perform. It is noted that the exemplary types of functional means disclosed herein have been provided for purposes of illustration, rather than by way of limitation and that other types of functional means may be utilized by robots operating in a system configured according to the present disclosure.

The one or more sensors 240 may include pressure sensors, accelerometers, gyroscopes, proximity sensors, or other sensors configured to provide information to the robot 200 regarding its operation and operating environment. The accelerometers, gyroscopes, and proximity sensors may provide sensor data to the motion and propulsion control system 250, which may use at least a portion of the sensor data to control navigation and movement of the robot 200. For example, during navigation of the robot 200 sensor data provided by the proximity sensors may be utilized to detect obstacles in the path of travel of the robot 200. When an obstacle is encountered and detected by the robot 200, the navigation module may reroute the robot 200 around the obstacle or the I/O devices 260 may generate an alert, such as a beep or other sound, or flash one or more lights to indicate an obstacle has been encountered and needs to be removed from the path of the robot 200.

The I/O devices 260 of the robot 200 may include communication interfaces (e.g., network communication interfaces, universal serial bus (USB) interfaces, Bluetooth communication interfaces, and the like) configured to communicatively couple the robot 200 to local devices (e.g., via the USB interface, etc.) and remote devices (e.g., via the network communication interfaces, Bluetooth communication interfaces, etc.). Such communication capabilities may enable bidirectional communication between the robot 200 and one or more local and external devices during operation of the robot 200. For example, operation of the robot 200 items may be controlled, at least in part, by an external source, such as a DLT client (e.g., the DLT client 154 of FIG. 1) via the bidirectional communication between the robot 200 and the external source over one or more networks (e.g., the one or more networks 170 of FIG. 1). Such communication may be facilitated by a wireless communication link (e.g., a Bluetooth communication link, a Wireless Fidelity (Wi-Fi) communication link, and the like) established between the robot 200 and the external source(s).

Additionally, the robot 200 may communicate information to a server or other network node. To illustrate, as the robot 200 moves and performs actions, state information (e.g., information indicating a current location of the robot 200, a current pose of the robot 200, and the like) may be transmitted to a remote device or node, such as the server 140 of FIG. 1 (or the DLT client) or the database node 130, or the DLT node 120. Transmission of such information by the robot 200 may, in some aspects, be initiated upon selection of the robot 200 for performing a task or sub-task in connection with a requested service. For example, once selected to provide at least one task of a sub-task, the robot 200 may periodically transmit state information to relevant portions of the system so that the performance of the task or sub-task may be monitored for completion. The transmission of the state information may provide useful information to other system entities in connection with providing the requested service and completing the one or more tasks or sub-tasks associated with the requested service. For example, as described in more detail herein, when multiple robots are coordinating to perform a service, one robot may be performing a task or sub-task that is dependent on completion of a previous task. By transmitting the state information, the robot that is to perform the second task or sub-task (e.g., the task or sub-task that is dependent on completion of the previous task) may monitor operations of the robot that is performing the previous task so that the robot may initiate the second task of sub-task upon detecting the previous task or sub-task has been completed.

The I/O devices 260 may also include one or more optical devices, such as light emitting diodes (LEDs) or other light sources, lasers, cameras, and the like. The light sources or LEDs may be configured to provide information associated with one or more aspects of the robot 200, such as to indicate a battery charge level (e.g., green for full or high battery charge level, yellow for moderate batter charge level, and red for low battery charge level), alert persons in the vicinity of the robot 200 (e.g., a flashing light to make individuals aware of the presence of the robot 200), or for other purposes. In an aspect, lasers may be provided to proximity information, such as a laser configured to provide information regarding a distance between the robot 200 and an obstacle or for other navigation purposes. It is noted that the exemplary I/O devices described herein have been provided for purposes of illustration, rather than by way of limitation and that robots configured in accordance with the present disclosure may include other I/O devices (e.g., a display device, a keyboard, a numeric keypad, a medication dispenser, and the like) depending on the particular applications for which the robots are provided.

As further illustrated in FIG. 2, the motion and propulsion control system 250 may include one or more controllers 252, one or more motors 254, traction components 256, and a navigation module 258. The one or more controllers 252 may be configured to control operations of the one or more motors 254 and the traction components 256 to navigate the robot 200 from a first location to a second location where the robot 200 is to perform a particular task or sub-task. The traction components 256 may include wheels, belts or treads, or other components configured to allow the robot 200 to traverse a distance based on driving forces provided by the one or more motors 254. In an aspect, the one or more motors 254 driving the traction components 256 may include one or more stepper motors configured to drive the traction components 256 in discrete increments. Utilizing stepper motors configured to drive the traction components 256 in discrete increments may provide advantages over other types of motor drive systems. For example, as explained herein, the robot 200 may be configured to autonomously navigate from a starting location to one or more remote locations to retrieve items (e.g., from a warehouse or storage facility) and then to a destination location to perform tasks or sub-tasks.

To facilitate navigation, information regarding an environment where the robot 200 is operating may be maintained by the system in a manner that is accessible to the robot 200 (e.g., via one or more networks), as described in more detail below with reference to FIGS. 3, 6 and 7. The navigation module 258 may be configured to store or retrieve information associated with environment where the robot 200 is operating and may use the information to determine a path of travel to an intended destination, such as a location where the robot is to perform one or more tasks or sub-tasks. After the robot 200 has completed all scheduled tasks or sub-tasks, the robot 200 may be configured to return to a docking bay (e.g., to recharge its batteries) until a new request to perform a task of sub-task is received.

Referring back to FIG. 1, each of the one or more servers 140 may include one or more processors 142, a memory 144, one or more execution engines 150, one or more reasoning engines 152, one or more DLT clients 154, and one or more input/output (I/O) devices 156. It is noted that functionalities described with reference to the one or more servers 140 are provided for purposes of illustration, rather than by way of limitation and that the exemplary functionalities described herein may be provided via other types of computing resource deployments. For example, in some embodiments, computing resources and functionality described in connection with the one or more servers 140 may be provided in a cloud-based system using computing resources and functionality provided by a cloud-based environment that is accessible over a network, such as one of the one or more networks 170. The one or more processors 142 may include one or more CPUs each having one or more processing cores, ASICs, FPGAs, microcontrollers, or other circuity and logic configured to provide the functionality described in connection with the one or more servers 140.

The memory 144 may include RAM devices, ROM devices, EPROM devices, EEPROM devices, one or more HDDs, one or more solid state drives (SSDs), flash memory devices, or other memory devices configured to store instruction in a persistent or non-persistent state. Software configured to facilitate operations and functionality of the one or more servers 140 may be stored in the memory 144 as instructions 146 that, when executed by the one or more processors 142, cause the one or more processors 142 to perform the operations described herein with respect to the one or more servers 140, as described in more detail herein.

The I/O devices 156 may include communication interfaces (e.g., network communication interfaces, USB interfaces, Bluetooth communication interfaces, and the like) configured to communicatively couple the one or more servers 140 to local devices (e.g., via the USB interface, etc.) and remote devices (e.g., via the network communication interfaces, etc.). Such communication capabilities may enable bidirectional communication between the one or more servers 140 and one or more local and external devices during operation of the system 100. For example, the communication interfaces may facilitate communication between the server(s) 140 and the one or more robots 110, the one or more DLT nodes 120, the one or more database nodes 130, and the request devices 160 over the one or more networks 170.

The one or more execution engines 150 may be configured to provide functionality for monitoring performance of a task by the one or more robots 110. For example, execution engine may utilize robot state information (e.g., information indicating a current state and/or location of a robot) to monitor performance of a task or sub-task by a robot, as described in more detail below with reference to FIGS. 3, 6, and 7. The one or more reasoning engines 152 may be configured to provide functionality for translating a request for a service into a task, a set of tasks, or a set of sub-tasks for execution by the one or more robots 110. For example, when a request for a service is received, the request may be processed, at least in part, by the reasoning engine 152 to generate a plan for providing the requested service. The plan may include determining a task recipe, which may include information that identifies specific tasks or sub-tasks to be performed, as well as information identifying robot characteristics needed to perform each of the specific tasks or sub-tasks. The reasoning 152 engine may generate or derive the task recipe based on information stored in the one or more database nodes 130, as described in more detail below with reference to FIG. 6.

The one or more DLT clients 154 may be configured to communicate with the one or more robots 110 to control various aspects of task execution. For example, the robots 110 may include a plurality of robots, where the plurality of robots includes at least two robots operated and controlled by different entities. A DLT client 154 may be provided for managing operations of the robots controlled by each of the different entities. Thus, if two entities control robots operating within system 100 at least two DLT clients 154 may be provided. In some aspects, multiple DLT clients 154 may be provided for robots controlled by a single entity, such as one DLT client 154 for each robot. The DLT clients 154 may be configured to receive task requests from the one or more requestor devices 160 and process the task requests to control execution of one or more tasks and sub-tasks by the robots 110. Exemplary aspects of processing task requests to control execution of one or more tasks and/or sub-tasks by the robots 110 are described and illustrated below with reference to FIG. 6.

The one or more database nodes 130 may be configured to provide the server 140 and more particularly, the execution engines 150, the reasoning engines 152, and the DLT clients 154, with network-based access to one or more databases 148. Referring briefly to FIG. 3, a block diagram illustrating aspects of a database node configured in accordance with embodiments of the present disclosure is shown as a database node 300. In aspects, the database node 300 may be representative of the one or more database nodes 130 of FIG. 1. As shown in FIG. 3, the database node 300 may include one or more processors 310 and a memory 320. The one or more processors 310 may include one or more CPUs each having one or more processing cores, ASICs, FPGAs, microcontrollers, or other circuity and logic configured to provide the functionality described herein with reference to the database node 300 and the database node(s) 130 of FIG. 1. Although not shown in FIG. 3, the database node 300 may include one or more communication interfaces configured to communicatively couple the database node 300 to one or more networks, such as the one or more networks 170 of FIG. 1.

The memory 320 may include RAM devices, ROM devices, EPROM devices, EEPROM devices, one or more HDDs, one or more SSDs, flash memory devices, or other memory devices configured to store data in a persistent or non-persistent state. Software configured to facilitate operations and functionality of the database node 300 may be stored in the memory 320 as instructions 322 that, when executed by the one or more processors 310, cause the one or more processors 310 to perform the operations described herein with respect to the database node 300 and the database node(s) 130 of FIG. 1, as described in more detail herein with reference to FIG. 6.

Additionally, one or more databases 324 may be stored at the memory 320. The one or more databases 324 may include a maps database, an object models database, a task recipe database, or other types of databases configured to facilitate operations of a system for coordinating performance of a task among a plurality of robots, such as the system 100 of FIG. 1. The maps database may include information associated with a floor plan or other information that indicates a layout of an environment in which robots are operating. The information stored in the maps database may be configured to facilitate navigation of the robots within the operating environment, such as to enable a robot to travel from a current location to a destination where the robot is to perform a task or sub-task. In an aspect, the map database may comprise a 3D coordinate frame (e.g., a world frame) that represents the operating environment in 3D space. As a robot navigates within the operating environment the robot may determine its relative position within the working environment based on the 3D coordinate frame. In an aspect, the map database may store information associated with multiple operating environments. To illustrate, the map database may be configured to support operations of robots within a plurality of geographically distributed operating environments and thus, may store map information for each of the geographically distributed operating environments. Enabling the database node 300 to store map information for multiple operating environments may reduce the number of database nodes present within the system. For example, a single database node may be provided for supporting operations in a plurality of geographically distributed operating environments instead of having a database node for each of the geographically distributed operating environments. Furthermore, multiple database nodes may be provided to support fault tolerance and for load balancing purposes, such that if a database node residing within a particular geographic area fails, a second database node may be accessed to retrieve relevant mapping information for facilitating operations of one or more robots in accordance with aspects of the present disclosure until the failed database node may be brought back online.

The object models database may be configured to store robot state information associated with the robots operating within the system. For example, the robot state information may include universal robot description format (URDF) data, semantic robot description format (SRDF) data, or other information that may be used to identify robot states and capabilities. For example, URDF data may be stored in an extensible markup language (XML) format and may describe various elements of the robots. For example, suppose that a robot has a base, a torso portion, one or more moveable arms attached to the torso portion, and one or more gripping means (e.g., a mechanical hand, pincers, etc.) attached to the one or more moveable arms and configured to grab an object. The URDF data may include information that describes the base, the torso portion, the one or more moveable arms, and the one or more gripping means, such as by specifying a 3D coordinate frame that provides a description of the robot and its components in 3D space as well as information that specifies a layout of each component of the robot relative to the other components. The SRDF data may represent aspects of the robot that are not specified in the URDF data, such as information having a semantic aspect. Exemplary data that may be represented in the SRDF may include information specifying joints of the robot components (e.g., a joint where the robotic arm is attached to the torso portion, etc.), transforms that may be used to specify a current pose of the robot, collision checking information, and the like. To illustrate, the URDF data may provide a model of the robot's components and the SRDF may be used to translate the URDF to a current pose that represents any movements that may have occurred as the robot is operated. As described in more detail below with reference to FIGS. 6 and 7, the URDF data and the SRDF data may be used by the system (e.g., the system 100 of FIG. 1) and more specifically, the execution engine(s) (e.g., the one or more execution engines 150 of FIG. 1) to monitor or track the performance of tasks by the one or more robots.

The task recipe database may store information that associated with one or more tasks. For example, suppose that a task that may be performed by robots within a system (e.g., the system 100 of FIG. 1) includes two sub-tasks. The task recipe database may store information that identifies the two sub-tasks. Where one of the two sub-tasks is dependent upon completion of the other sub-task, the task recipe information may specify an order in which the sub-tasks must be completed. The task recipe database may be used to translate a request for services into a set of tasks or sub-tasks that may be provided via operation of one or more robots. In an aspect, the task recipe database may further identify robot characteristics for each task or sub-task. For example, if a task or sub-task requires an object to be picked up at a particular location and transported to another location, the task recipe database may identify the task or sub-task as requiring a robot having a capability to pick up an object. As described in more detail below with reference to FIGS. 5 and 6, the task recipe database may be utilized to identify one or more robots for performing a requested service or set of tasks in a coordinated an autonomous manner. It is noted that the exemplary information stored in the task recipe database has been provided for purposes of illustration, rather than by way of limitation and that information specifying tasks and sub-tasks, as well as the robot capabilities or characteristics needed for each task or sub-task, may be specified in other ways or using additional types of information depending on a particular configuration of the system and the task recipe database. Accordingly, the present disclosure is not to be limited to any particular format for specifying task, sub-task, or task characteristic data.

Referring back to FIG. 1, the DLT nodes 120 may be configured to maintain a distributed ledger configured to store records associated with operational aspects of the system 100. For example, the distributed ledger may store records that include digital identification (DID) information associated with each of the robots 110, capabilities or characteristic information associated with each of the robots 110, smart contract data (e.g., one or more master smart contracts, instances of the master smart contract instantiated during performance of a requested task, and the like), or other information. In an aspect, the distributed ledger managed by the DLT nodes 120 may be provided via a distributed database system. For example, the system 100 may include a plurality of DLT nodes 120 and each of the DLT nodes 120 may maintain a copy of at least a portion of the records of the distributed ledger. In some implementations, each of the DLT nodes 120 may maintain a full copy of the records of the distributed ledger (e.g., a record may originate at one DLT node and then be replicated to other DLT nodes). In an aspect, the distributed ledger may be provided via a public blockchain (e.g., the Ethereum blockchain) or may be provided via a private blockchain (e.g., a blockchain maintained by the DLT nodes 120). It is noted that implementing the distributed ledger via a blockchain may enhance the distributed and decentralized nature of the system 100. For example, as blocks are written to the blockchain, such as records associated with robot identity and capability information or information associated with tasks executed by the robots 110, each block may provide an immutable record of the saved information, thereby increasing the trustworthiness of the records. The trustworthiness of the records provided by the blockchain may serve to mitigate instances of malicious actors and ensure that robots are being operated in a manner that generally promotes an efficient and healthy operating environment in which services may be provided by the robots 110 in a timely and sage manner. Additionally, because the information recorded to the distributed ledger may be authenticated, system participants (e.g., entities providing robots to the system, entities operating the environment in which the robots are deployed, or other entities) may validate the fairness of the system 100, such as to ensure that the system 100 is not biased (e.g., never selecting a particular robot for performing a task for an arbitrary reason). This may encourage more entities to participate in the system (e.g., by providing robots) which may increase the levels of service that may be provided (e.g., due to the increased availability of robots having capabilities to perform tasks associated with the offered services) and may drive the cost of the services down as the robots compete for selection by the system 100.

It is noted that while information associated with the distributed ledger records may be recorded to the blockchain, this does not necessarily mean that the actual data records are recorded to the blockchain. For example, in some instances, information may be recorded to a distributed database system as one or more records and information that may be used to authenticate the one or more records may be recorded to the blockchain, such as a hash value of the one or more records. To verify the integrity of the one or more records, the information recorded to the blockchain and the one or more records may be retrieved and a new hash value (or whatever technique is used to generate the information stored to the blockchain) may be computed based on the database records and compared to the information retrieved from the blockchain. The information retrieved from the blockchain may be determined to be authentic when the two pieces of information (e.g., the value stored to the blockchain and the value computed from the record(s) retrieved from the database) match and may be determined to have been tampered with if the two pieces of information do not match. Additional details and functionality that may be provided by the DLT nodes 120 and the distributed ledger are described in more detail below with reference to FIGS. 5-7.

Referring to FIG. 4, a block diagram illustrating a DLT node in accordance with aspect of the present disclosure is shown as a DLT node 400. In an aspect, the DLT node 400 may be one of the DLT nodes 120 of FIG. 1. As shown in FIG. 4, the DLT node 400 includes one or more processors 410 and a memory 420. The one or more processors 410 may include one or more CPUs or graphics processing units (GPUs) each having one or more processing cores, ASICs, FPGAs, microcontrollers, or other circuity and logic configured to provide the functionality described herein with reference to the DLT node 400 and the DLT node(s) 120 of FIG. 1. Although not shown in FIG. 4, the DLT node 400 may include one or more communication interfaces configured to communicatively couple the DLT node 400 to one or more networks, such as the one or more networks 170 of FIG. 1.

The memory 420 may include RAM devices, ROM devices, EPROM devices, EEPROM devices, one or more HDDs, one or more SSDs, flash memory devices, or other memory devices configured to store data in a persistent or non-persistent state. Software configured to facilitate operations and functionality of the DLT node 400 may be stored in the memory 420 as instructions 422 that, when executed by the one or more processors 410, cause the one or more processors 410 to perform the operations described herein with respect to the DLT node 400 and the DLT node(s) 120 of FIG. 1, as described in more detail herein with reference to FIGS. 5-7.

Additionally, the memory 420 may include a distributed ledger 424. As described above with reference to FIG. 1, the distributed ledger 424 may be provided as part of a distributed database system in which each DLT node stores all or a portion of the information recorded to the distributed ledger. Additionally or alternatively, the distributed ledger 424 may be provided, at least in part by a public or private blockchain. When the distributed ledger 424 is provided via a private blockchain, the blockchain may be maintained within the memory 420 or a portion of the memory 420. However, when the distributed ledger 424 is provided via a public blockchain, it may be advantageous to record the data (e.g., robot DIDs, robot capability information, service records, and the like) at the memory 420 as part of a distributed database and to record information that may be used to authenticate the information stored at the memory 420 on the public blockchain. This is advantageous as it minimizes the amount of data recorded to the public blockchain, which may reduce the impact that the information has on the public blockchain, while also enabling authentication of the data records maintained in the memory 420, as described above with reference to FIG. 1. It is noted however that all of the data may be recorded to the public blockchain if desired for some implementations.

In addition to recording the robot DIDs and capability information, as well as the service records (e.g., information regarding provisioning of services through performance of one or more tasks or sub-tasks by robots), to the distributed ledger 424, the DLT node 400 may be configured to record one or more master smart contracts and records associated with one or more smart contracts created based on the one or more master smart contracts at the distributed ledger 424. Exemplary aspects of utilizing smart contracts in accordance with aspects of provisioning services via coordination of tasks between robots are described in more detail below with reference to FIGS. 5-7. Further, the distributed ledger 424 may store information associated with compensation of robots. For example, each robot operating in a system (e.g., the system 100 of FIG. 1) may be associated with compensation information that specifies how much the robot (or the entity providing the robot) is to be compensated in exchange for performing one or more tasks or sub-tasks in connection with providing one or more requested services. The compensation may be indicated on a per task basis (e.g., $20 for completing task A, $50 for completing task B, etc.), on a unit of time basis (e.g., $5 per minute, $15 per hour, $500 per day, etc.), or some other basis. Additionally, the compensation information may indicate one or more types of acceptable payment methods (e.g., electronic funds transfer, bank draft, a wire transaction, etc.) and/or currencies (e.g., United States dollars, one or more cryptocurrencies, Euros, etc.). It is noted that the exemplary compensation information described above has been provided for purposes of illustration, rather than by way of limitation and that other types of information may be used to specify how robots participating in a cooperative system, such as the system 100 of FIG. 1, are compensated in accordance with aspects of the present disclosure.

Figure 5:
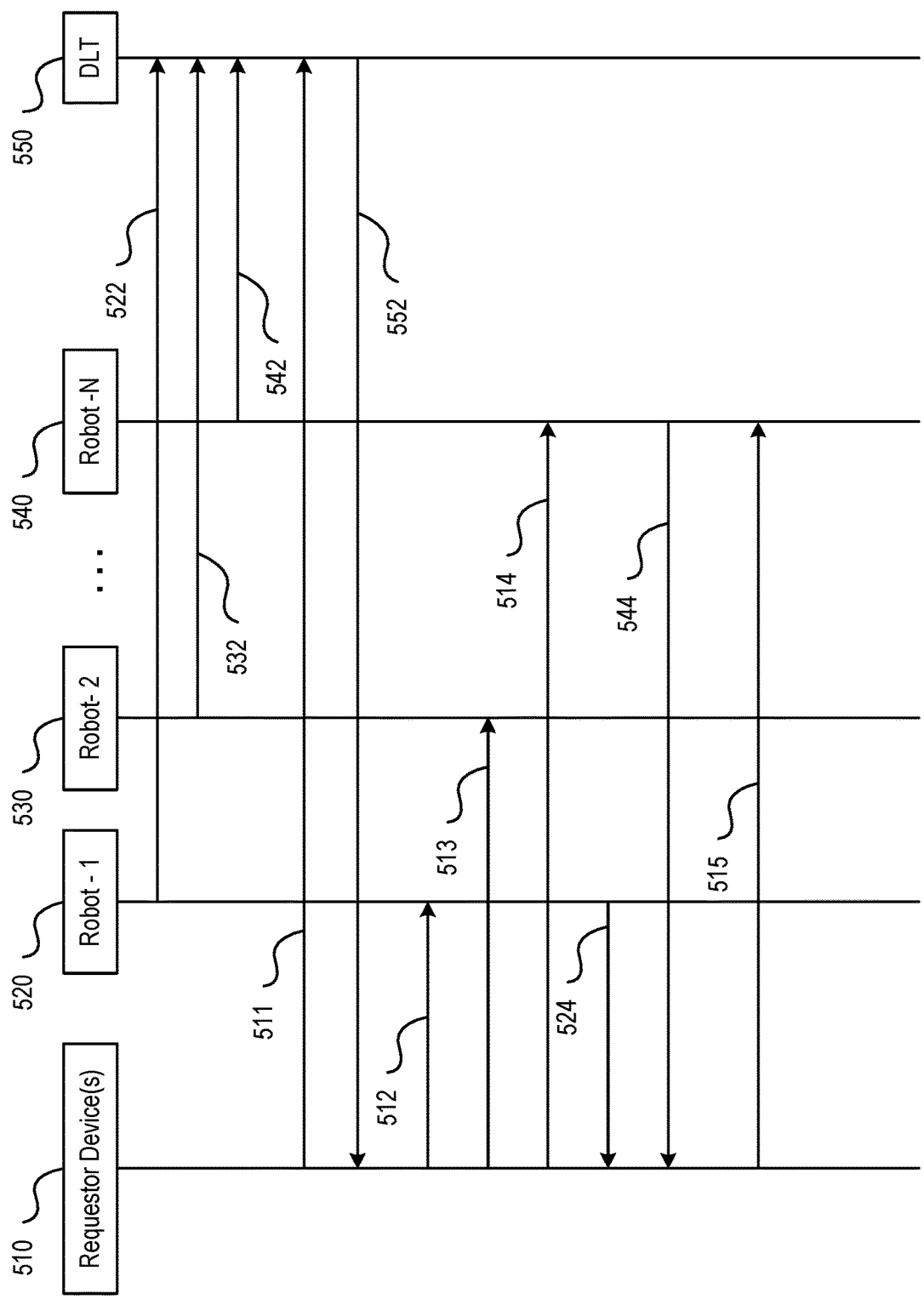
FIG. 5 is a ladder diagram illustrating aspects of a process for identification of candidate robots in accordance with embodiments of the present disclosure.

Referring to FIG. 5, a ladder diagram illustrating aspects of a process for identification of candidate robots in accordance with embodiments of the present disclosure is shown. In FIG. 5, a requestor device 510, a plurality of robots 520-540, and DLT 550 are shown. The plurality of robots includes N robots, such as a first robot 520, a second robot 530, and an Nth robot 540. It is noted that while FIG. 5 illustrates at least 3 robots, embodiments of the present disclosure may utilize more than three or less than three robots depending on the particular configuration of the system and environment in which the robots are operating. In aspects, each of the plurality of robots may be one of the one or more robots 110 of FIG. 1 or the robot 200 of FIG. 2. The DLT 550 may include one or more DLT nodes (e.g., the DLT nodes 120 of FIG. 1 or the DLT nodes 400 of FIG. 4) and a distributed ledger recorded to a distributed database, a public or private blockchain, or a combination of a distributed database and a public or private blockchain, as described above with reference to FIGS. 1 and 4.

Each of the plurality of robots may register characteristics with the DLT 550. To illustrate, the first robot 520 may transmit, at 522, information or a message that indicates characteristics (e.g., hardware and capabilities) of the first robot 520 to DLT 550, the second robot 530 may transmit, at 532, information or a message that indicates characteristics (e.g., hardware and capabilities) of the second robot 530 to DLT 550, and the Nth robot 540 may transmit, at 542, information or a message that indicates characteristics (e.g., hardware and capabilities) of the Nth robot 540 to DLT 550. As described above with reference to FIGS. 1 and 4, the characteristics of the robots may be recorded to a distributed ledger (e.g., the distributed ledger maintained by the DLT nodes 120 of FIG. 1 or the distributed ledger 424 of FIG. 4) provided or maintained by the DLT 550. For example, as described above with reference to FIGS. 1 and 4, the characteristics of the robots may be recorded to a distributed ledger provided by a distributed database system or may be recorded to one or more blocks on a public or private blockchain. In some aspects, the characteristics may be stored in a distributed ledger maintained by a distributed database (e.g., a distributed database provided by the DLT nodes 120 of FIG. 1 or the DLT nodes 400 of FIG. 4) and information that may be used to authenticate the records stored at the distributed database may be recorded to the one or more blocks of the public or private blockchain.

Once registration of the robot characteristics has been completed, the robots may be authorized to participate in completion of tasks. For example, the requestor device 510 may receive information regarding a task to be completed or a service to be provided by one or more of the plurality of robots. Upon receiving the information regarding the task, the requestor device 510 may transmit, at 511, information regarding the task to the DLT 550. Once received, the DLT 550 may compute a list of candidate robots based on the characteristics registered by the plurality of robots. For example, the task information provided by the requestor device 510 (e.g., at 511) may specify a task to be completed, a timeframe for completing the task, a location where the task is to be completed, and other information that may be used to identify the list of candidate robots. It is noted that the task to be completed may simply identify the task, such as by including a task code, and the list of candidate robots may be determined by evaluating whether the characteristics of any of the registered robots, which include the robots 520-540 in this example, include capabilities for performing the identified task.

Upon identifying the list of candidate robots, the DLT 550 may transmit, at 552, information to the requestor device 510 that identifies the candidate robots. In this example, the list of candidate robots includes the first robot 520, the second robot 530, and the Nth robot 540. Upon receiving the list of candidate robots, the requestor device 510 may transmit a challenge to each of the candidate robots. For example, a first challenge may be transmitted, at 512, to the first robot 520, a second challenge may be transmitted, at 513, to the second robot 530, and a third challenge may be transmitted, at 514, to the Nth robot 540. The challenge transmitted by the requestor device may be configured to ensure a secure and tamper-proof distribution of robot state data. Additional aspects of challenges that may be utilized by a system according to the present disclosure are described in more detail below.

Upon receiving the challenge, the robots identified in the list of candidate robots may either ignore the challenge or may respond to the challenge with a computation proof. A robot may choose to ignore the challenge for a variety of reasons. For example, a challenge may be ignored if the robot is not able to perform the task within a specific time period or if the robot does not possess all resources needed to perform the task (e.g., the task is to distribute a medication that the robot does not currently have in stock). Robots operating in a system configured according to the present disclosure may also ignore challenges for non-capability related reasons, such as the amount that may be paid to the owner of the robot in exchange for the robot performing the requested task is below a threshold. If the robot chooses to respond to the challenge, the robot may derive a computation proof based on the issued challenge and transmit the computation proof to the requestor device 510. For example, as illustrated in FIG. 5 the first robot 520 may transmit, at 524, a first computational proof to the requestor device 510 and the Nth robot 540 may transmit, at 544, a second computational proof to the requestor device 510.

Once all of the computational proofs are received by the requestor device 510 from the interested candidate robots, the requestor device 510 may select one of the interested candidate robots from which a computational proof was received and initiate a coalition process by transmitting a coalition request to the selected candidate robot. For example, in FIG. 5, the requestor device 510 has selected the Nth robot 540 and transmits, at 515, the coalition request to the Nth robot 540.

Figure 6:
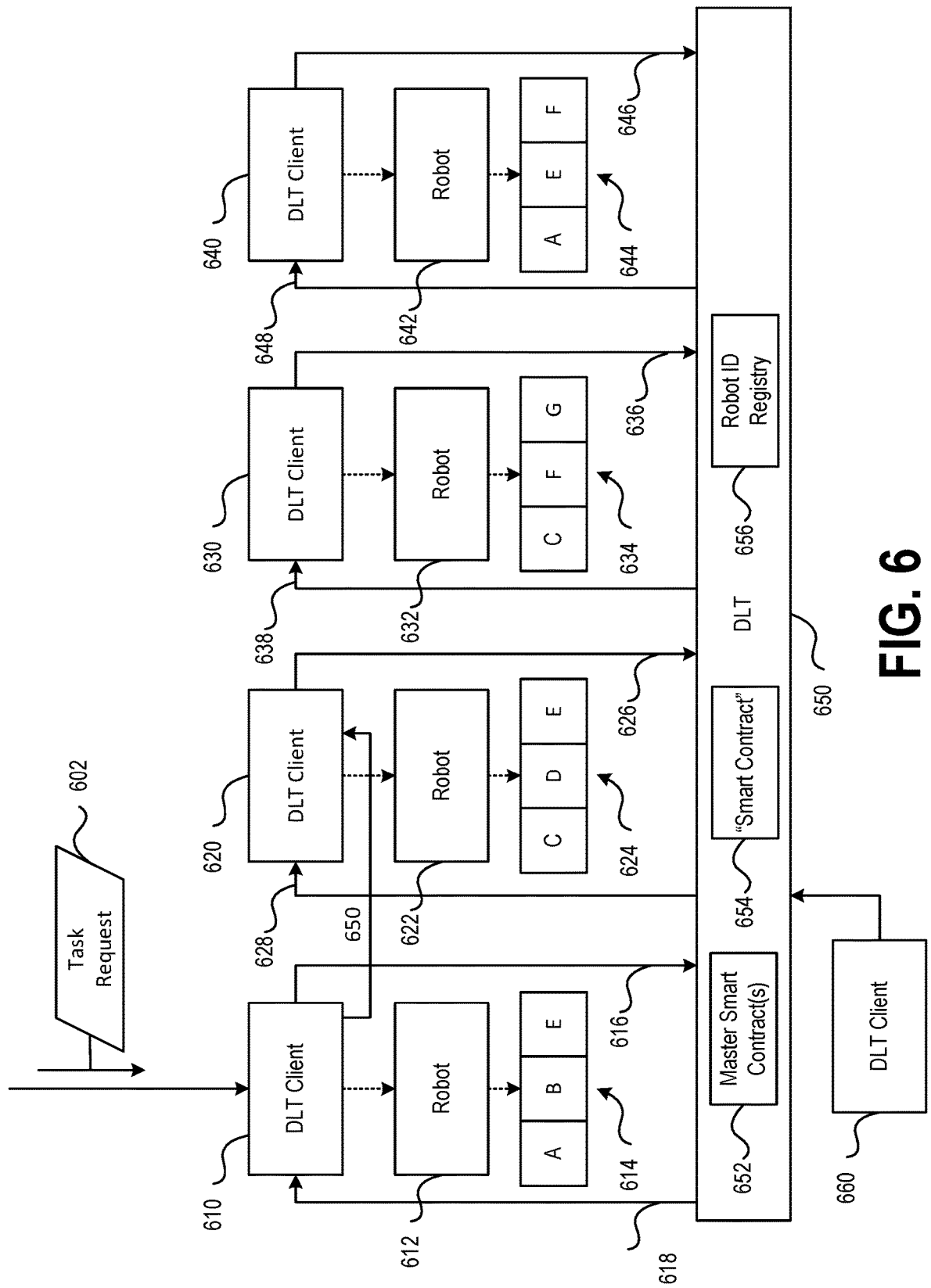
FIG. 6 is a block diagram illustrating aspects of a robot identification and selection process in accordance with embodiments of the present disclosure.

Referring to FIG. 6, a block diagram illustrating aspects of a robot identification and selection process in accordance with embodiments of the present disclosure is shown. It is noted that aspects of the identification and selection process shown in FIG. 6 may be performed in a system (e.g., the system 100 of FIG. 1) and may utilize signaling techniques similar to the techniques described above with reference to FIG. 5.

In FIG. 6, a plurality of DLT clients, including a DLT client 610, a DLT client 620, a DLT client 630, a DLT client 640, and a DLT client 660 are shown. Each of the DLT clients 610, 620, 630, 640 may be associated with one or more robots (e.g., one or more robots 110 of FIG. 1). For example, in FIG. 6, the DLT client 610 may be associated with a robot 612, the DLT client 620 may be associated with a robot 622, the DLT client 630 may be associated with a robot 632, and the DLT client 640 may be associated with a robot 642. Each of the robots 612, 622, 632, 642 may be owned or controlled by a separate entity (e.g., a company, individual, service provider, division within a company, and the like). The DLT clients may be configured to receive information from and provide information to the DLT 650. To illustrate, lines 616, 626, 636, 646 indicate information being provided to the DLT 650 by the DLT clients 610, 620, 630, 640, respectively, and lines 618, 628, 638, 648 indicate information being provided from the DLT 650 to the DLT clients 610, 620, 630, 640, respectively. In an aspect, communication between the DLT clients 610, 620, 630, 640 and the DLT 650 may be facilitated via the one or more networks of FIG. 1.

As shown in FIG. 6, each of the plurality of robots may be associated with one or more capabilities. For example, the robot 612 may be associated with a set of capabilities 614 that includes capabilities A, B, and C; the robot 622 may be associated with a set of capabilities 624 that includes capabilities C, D, and E; the robot 632 may be associated with a set of capabilities 634 that includes capabilities C, F, and G; and the robot 642 may be associated with a set of capabilities 644 that includes capabilities A, E, and F. Although not illustrated in FIG. 6, each of the plurality of robots may have registered their respective characteristics or capabilities with the DLT 650, as described above with reference to FIGS. 1 and 5. Each of the capabilities may represent characteristics of the corresponding robot and may be used to determine whether any robots of the plurality of robots are suitable for performing a requested task. As shown in FIG. 6, the robot capabilities may be recorded in a robot identification (ID) registry 656. Additional aspects of the information that may be stored at the robot ID registry 656 are described in more detail below.

As shown in FIG. 6, the DLT client 610 may receive a task request 602. The task request 602 may include information that identifies one or more tasks to be performed by at least one robot of the plurality of robots. In an aspect, the task request 602 may include one or more task codes or other information that may be used to determine one or more tasks being requested by the task request 602. Upon receiving the task request 602, the DLT client 610 may determine a plan for processing and completing one or more tasks of the task request 602. In an aspect, the DLT client 610 may determine the plan associated with the task request 602 based on a task recipe. To illustrate, the DLT client 610 may determine the task recipe based on information stored in a database, such as one of the one or more database nodes 130 of FIG. 1 or the database node 300 of FIG. 3. The DLT client 610 may provide the information included in the task request 602 and the task recipe information to a reasoning engine (e.g., the reasoning engine 152 of FIG. 1).

The reasoning engine may be configured to analyze at least a portion of the information included in the task request 602 and the task recipe information to determine whether the robot 612 possesses all of the capabilities to complete the task(s) indicated by the task recipe. To illustrate, the reasoning engine may use information associated with the robot 612 to evaluate whether the robot 612 possesses all capabilities to complete the one or more tasks identified by the task recipe. The information associated with the robot 612 may include URDF data, SRDF data, or other information that may be used to identify the robot 612 and its capabilities. In the example illustrated in FIG. 6, the task request 602 may be associated with a task recipe that requires a set of robot capabilities that includes capabilities "A", "B", and "C". The reasoning engine utilized by the DLT agent 610 may determine that the robot 612 includes capabilities "A" and "B" but does not possess capability "C", which indicates that another robot should be recruited to aid in completion of the task and the recruited robot should have at least capability "C".

Because the robot 612 does not possess all of the capabilities to complete the task(s) indicated by the task request 602 (e.g., because capability "C" is missing), the DLT client 610 may transmit a transaction request to the DLT 650. The transaction request may identify one or more parameters associated with the task for which assistance is needed. For example, the transaction request may include task information associated with the task or sub-task for which help is needed, capacity information, environmental data associated with the environment where the task or sub-task is to be completed, or other parameters. The task information may indicate a capability that is needed, such as capability "C". Additionally or alternatively, the task information included in the transaction request may identify a task or sub-task (e.g., using a code or other identifier) for which assistance is needed. It is noted that the transaction request may include both capability information and information that identifies a particular task or sub-task to be performed (e.g., using the requested capability or capabilities). Exemplary environmental data that may be included in the transaction request may include restriction information, such as information that specifies a zone of operation (e.g., an area where the task or sub-task is to be performed), a maximum weight (e.g., of the robot), maximum dimensions (e.g., information specifying dimensions for a hallway, doorway, room, etc. in which the robot will operate when performing a requested task or sub-task, or information specifying dimensions of a robot that may fit within the dimensions of the hallway, doorway, etc. where the task or sub-task will be performed), navigation parameters (e.g., types of sensors, communication devices, systems, etc. that may be utilized by a robot to navigate the environment where the requested task or sub-task is to be performed, such as proximity sensors, infrared sensors, global positioning system (GPS) capabilities, base stations or transponders for navigation using triangulation, and the like), operational limitations (e.g., forbidden vibration frequencies, such as frequencies that may impact equipment or sensors in the environment, locations where the robots are not permitted access, etc.), operational areas (e.g., information providing a floor plan or information about the layout of the environment, such as entrance/exit locations, room identifiers, etc.), or other types of information that may aid robots in performing tasks or sub-tasks within an operating environment. In addition to the environmental data and the task information, the information included in the task request may indicate an "atomicity" of the requested tasks or sub-tasks. For example, the "atomicity" information may indicate whether a particular task can (or cannot) be divided into smaller tasks (e.g., sub-tasks) and whether two or more sub-tasks (corresponding to a task that has been divided into smaller pieces) needs to be carried out by the same robot. Examples of "other parameters" that may be included in the transaction request may include cost information (e.g., an amount of money or other currency that may be paid to an operator of a robot for providing a needed capability in connection with a task), time information (e.g., a time period in which the task needs to be completed or preferably completed, etc.), requestor identification information that identifies the party transmitting the transaction request (e.g., an operator of DLT client 610 or simply information identifying the DLT client 610 or the robot 612), and the like. As another example of an "other parameter," a task request may include (geo)location data. The location data may provide information associated with a location or locations where a task is to be performed and may be used in conjunction with the environmental data to schedule tasks, identify robots, and perform the tasks (e.g., for navigation purposes, and the like). The requestor identification information may be used to associate the transaction request with a responsible party (e.g., if a payment will be provided to any entity controlling a robot fulfilling the requested capabilities associated with the transaction request). In an aspect, the transaction request may be the transmission 511 described above with reference to FIG. 5.

The DLT 650 may be configured to generate a list of candidate robots having the capabilities that include capability "C." For example, the list of candidate robots may include the robot 622 and the robot 632, which both possess capability "C," but may not include the robot 642 because this robot does not possess capability "C" (e.g., the only capability indicated as needed by the DLT client 610. It is noted that if the information transmitted to the DLT 650 by DLT client 610 identified capability "A" instead of capability "C," the list of candidate robots would include the robot 642 and would not include the robots 622, 632. As another example, if the information indicated that capabilities "C" and "F" were needed, the list of candidate robots may indicate that the robots 624 and 634 include capability "C" and that the robots 632 and 642 include capability "F." In such a scenario, it may be more likely that the robot 632 may be selected over the robots 622 and 642 since the robot 632 includes both needed capabilities. However, such an example assumes an ideal scenario where all robots are currently available to perform the task for which capabilities "C" and "F" may be requested and that there are no other factors that may cause the DLT client 610 to select a different set of robots to perform the functionality associated with capabilities "C" and "F," such as cost or some other factor.

In an aspect, generation of the list of candidate robots by the DLT 650 may be performed as part of a smart contract initiated upon receiving the transaction request from the DLT client 610. For example, the DLT 650 may store one or more master smart contract 652 and may initiate an instance of the master smart contract based on the received transaction request. The instance of the master smart contract, shown in FIG. 6 as Smart Contract 654, may be initialized based on information included in the transaction request. For example, the Smart Contract 654 may be configured to indicate that a first party to the Smart Contract 654 is the entity operating the DLT client 610 (or the DLT client 610 itself and/or the robot 612), the Smart Contract 654 has been initiated to obtain assistance by a robot having capability "C" (or other information indicating the reason for which the transaction request was transmitted to the DLT 650), or other initialization parameters.

It is noted that the DLT 650 may include a single master smart contract or may include a plurality of master smart contracts. To illustrate, each entity that controls at least one robot available for hire or use by the system (e.g., the system 100 of FIG. 1) may have a master smart contract that is particular to the controlling entity and that must be accepted by any entities controlling robots "hired" according to the techniques disclosed herein. Alternatively, a single master smart contract may be retained by the DLT 650 and may contain standardized terms and conditions. As another additional or alternative implementation, master smart contracts specific to some entities may be maintained by the DLT 650 and the DLT 650 may also maintain a general master smart contract that may be utilized by any entities that choose not to maintain a customer master smart contract on the DLT 650. While a single master smart contract may simplify implementation, providing capabilities for using custom smart contracts may be beneficial for some implementations and environments. For example, a single master smart contract may be suitable for systems where costs (e.g., for operating and "hiring" robots) are standardized or subject to minimal fluctuations, while customized master smart contracts may be utilized in systems where costs are subject to large fluctuations. In still other aspects, a master smart contract 652 may be maintained at the DLT 650 by a third party (e.g., a party that does not operate any robots of the system), such as by a health insurance provider (e.g., to ensure that costs are maintained within limits imposed by the health insurance providers agreed pricing limits or for other reasons).

The Smart Contract 654, whether created based on a general master smart contract or a custom master smart contract, may include a process configured to access the robot ID registry 656 of the DLT 650 to identify any robots having the requested capabilities or characteristics. In an aspect, the robot ID registry 656 may include information associated DLT clients corresponding to the registered robots. For example, during registration of the robots and their capabilities, as described with reference to FIG. 5, information associated with one or more DLT clients corresponding to the registered robots may also be recorded in the robot ID registry 656 of the DLT 650. Based on the information obtained from the robot ID registry 656, a list of candidate robots may be identified.

Continuing with the example above where capability "C" is needed, once the list of candidate robots is identified, the candidate robots may be issued a challenge, as described with reference to FIG. 5. In an aspect, the challenge may be issued by providing the challenge to a DLT agent corresponding to each candidate robot. To illustrate, the challenge may be issued to DLT agent 620 corresponding to candidate robot 622 and to DLT agent 630 corresponding to candidate robot 622 because the robots 622 and 632 were identified in the list of candidate robots (e.g., since both robots include capability "C"). Upon receiving the challenge, one or both of the DLT clients 620, 630, or the corresponding robots 622, 632, may calculate a proof of computation based on the challenge and transmit the proof of computation to the DLT 650, as described above with reference to FIG. 5. In an aspect, the challenge may include an algorithm with a verifiable computation setup. It is noted that the computation verification flow depends on the particular verifiable computation scheme that is used. As an example, the challenge may be based on the Pinocchio verifiable computation scheme. Further, it is noted that systems according to the present disclosure may utilize proof-of-computation techniques, or may additionally or alternatively use peer review techniques to oversee the provisioning of requested services, as described in more detail below with reference to FIG. 7.

The proof of computation(s), whether calculated by the DLT client or the corresponding robot, may be transmitted from the DLT client and received by the DLT 650. It is noted that while the proof of computation may typically be sent to the DLT 650, in some aspects the proof of computation may be sent to one or more intermediate nodes (e.g., DLT clients) in some circumstances; however, direct transmission of the proof of computation to the DLT 650 may reduce the likelihood that a malicious actor could impact (e.g., by manipulating or altering the proof of computation data) how the proof of computation is treated by the DLT 650, such as for selection processes. Although optional, storage of the proof of computation in a blockchain may strengthen the verification of the process and increase the overall trust level of the system. In an aspect, the on-chain storage and verification of proof of computation data may simply involve storing a Boolean value (e.g., true or false, etc.) based on the initial request.

As described above with reference to FIG. 5, once the proof of computation is received, the one or more received proof of computations may be validated and a selection process may be performed to select a particular robot from among the robots that provided a validated proof of computation. In the example of FIG. 6, the Smart Contract 654 may execute the selection process to determine which one of the robots for which a proof of computation was provided to select for assisting with the requested task(s). For example, suppose that proof of computations are received for both robots 622 and 632, both of which include capability "C" needed for the task(s) requested by the task request 602. The robot 622 may be selected via the selection process and may transmit, as indicated at 650, a coalition request to the DLT client 632 to indicate that the robot 632 has been requested to assist with completion of the task(s). In an aspect, the selection process may be configured to select the particular robot based on a validation score. For example, the validation process performed on the proof of computations may be configured to generate a score and the robot achieving the highest score may be selected by the selection process.

In an aspect, the proof of computation may be scored based on criteria in addition to the proof verification result (e.g., true or false). For example, the scoring may also be based on the computation result itself. The result may differ according to different parameters of the robot. To illustrate, the score may be computed in many different ways. One example could be a weighted polynomial equation following the pattern $(X_{11}+(X_{21}-X_{22})*A_1+ \ldots +(X_{yz}-X_{yz+1})*A_n$, where the $A_n$ is a weight and the $X_{yz}$ are the input parameters to be compared. The proof of computation serves to provide assurance that the challenge is computed correctly by the participants. It is noted that the example above has been provided for purposes of illustration, rather than by way of limitation and that more complex and iterative scoring processes may also be utilized. In some aspects, more complex and/or iterative scoring processes may utilize smart contracts (e.g., instead of proof computation) to give a score without possibility of cheating for the participants. Further, aspects of the DLT-based systems disclosed herein may facilitate a marketplace for robot services as well as reputation systems for the different robots registered to and operating within the system(s). As described in more detail below, witnesses may be used to verify performance of services and tasks by robots and provide meaningful information regarding the robots operating within the system. Such information may include statistics regarding task completion rates (e.g., how often does a particular robot complete a task for which it has been selected, etc.), time information (e.g., how much time does it take a particular robot to complete a task, respond to requests to perform tasks, etc.), or other information. In some aspects, the information provided by witnesses may be used as a criteria for choosing one robot or another. Over time, the information compiled by the system may provide a rich history into the operation of the system, the performance and reliability of the robots, and other information that may enable more intelligent selection of robots, which may ensure that tasks are completed in a trustworthy and timely manner and that the system is operating without any malicious actors.

As described above with reference to FIG. 5, once the selection process is complete and a robot (or robots if multiple are needed to satisfy all "needed" capabilities for completing the task) has been selected, information associated with the selected robot(s) may be transmitted to the DLT client 610. The information transmitted to the DLT client 610 may include ID data for the selected robot. The ID data may include endpoint data, SRDF data, URDF data or other information. The information transmitted to the DLT client 610 may be configured to allow the DLT client 610 or the robot 612 to connect or communicate with the selected robot (e.g., the robot 622) and/or monitor a state of the selected robot.

For example, the system may be associated with a plurality of coordinate frames that may change over time. Exemplary coordinate frames that may be associated with the system include a world frame, a base frame, and a gripper frame. The world frame may provide a coordinate system associated with an environment in which the one or more robots of the system are operating and may be used to track locations of the robots within their respective operating environment. The base frame may provide an indication of the relative location of a base of a robot within the coordinate system of the world frame and the gripper frame may be associated with a pose of an object held within a gripping means of the robot relative to the base, such as a pose of an object held in of a robotic hand. It is noted that the exemplary coordinate frames described above have been provided for purposes of illustration, rather than by way of limitation and that a system operating in accordance with embodiments of the present disclosure may utilize other coordinate frames in addition to one or more of the above-identified coordinate frames.

As each of the robots of the system moves, whether during performance of a requested task or in between tasks (e.g., returning to a charging station to recharge a battery, travelling to a station where one or more out of stock items, such as medications, may be replenished, etc.), coordinate frame information may be recorded. For example, the coordinate frame data may be recorded to a database, such as the database provided by the database node 130 of FIG. 1 or the database 324 of FIG. 3. When coordinate frame changes are recorded to the database, the coordinate frame information may be stored in association with information identifying the robot providing the updated coordinate frame information. Additionally, the coordinate frame information may be timestamped to facilitate tracking of robot movements over time. Using the recorded coordinate frame information and the robot ID data received for the selected robot, the DLT client 610 (or the robot 612) may be enabled to track performance of the requested task(s). For example, suppose that the task request 602 includes two sub-tasks and the first sub-task and the first sub-task requires the capability "C" to be provided by the robot 622 (as the selected robot).

The robot 612, which is to perform the second sub-task using the capabilities "A" and "B" may monitor the coordinate frame data corresponding to the robot 622 (e.g., using the ID data for the robot 622 received following the selection process) to determine when the robot 622 has completed the first sub-task. It is noted that the robot 612 may perform one or more setup portions of the second sub-task despite first sub-task performed by the robot 622 being incomplete. For example, the robot 612 may determine that the second robot 622 is performing first sub-task and may begin navigating to a location where the robot 612 is to perform the second sub-task. The determination to start navigating to the location where the second sub-task is to be performed may be based on an estimated amount of time for the robot 612 to travel from its current location to the location where the second sub-task is to be performed, which may be determined based on coordinate frame information associated with the robot 612, information associated with the location where the second sub-task is to be performed, and the world coordinate frame data. As illustrated above, maintaining coordinate frame information for each robot operating within the system and providing ID data for robots selected to assist with performance of a requested task enables robots to monitor performance of tasks and/or sub-tasks in a verified and trustworthy manner.

Regardless of whether the robot 622 is to perform the task(s) requiring capability "C" before or after the portions of the task(s) requiring capabilities "A" and "B" provided by the robot 612, upon completion of its task or sub-task the robot 612 and the robot 622 may provide information to the Smart Contract 654 to indicate that the portions of the task or sub-tasks each robot performed have been completed. For example, by monitoring the coordinate frame data, the robot 612 and/or the DLT client 610 may verify that the robot 622 completed the portion of the task for which it was "hired" and may authorize completion of the Smart Contract 654. In an aspect, providing authorization to complete the Smart Contract 654 may enable any incentives to be distributed (or authorized for distribution) to the robot 622 for assisting with the requested task. For example, if the Smart Contract provides for payment to the operator of the robot 622 for assisting with completing the task associated with the task request 602, authorization to complete the Smart Contract 654 may authorize a release of funds to the operator of the robot 622. The release of the funds may include an electronic payment, such as an electronic funds transfer from a bank account or may a transfer of an amount of cryptocurrency to a crypto wallet associated with the operator of the robot 622. Additional exemplary aspects of providing incentives in connection with coordinating performance of one or more tasks between a plurality of robots in accordance with the present disclosure are described in more detail below with reference to FIG. 7.

It is noted that a DLT client may transmit the proof of computation only when the corresponding robot having the appropriate capabilities is "interested" in contributing to performance of the requested task. Thus, despite a corresponding robot having the requested capability (e.g., capability "C"), a DLT client may determine not to generate and transmit the proof of computation for a variety of reasons. To illustrate, the DLT client may evaluate at least one of a plurality of criteria associated with assisting with the requested task(s) to determine whether to generate and transmit the proof of computation. The plurality of criteria may include cost, availability, other available tasks, or other criteria upon which the DLT client may base a determination to generate and transmit the proof of computation. The cost criteria may be used to perform a monetary evaluation of the task, such as to determine whether an amount of money that may be paid to the operator of the corresponding robot satisfies a threshold cost and the proof of computation may be generated and transmitted when the amount of money is equal to or exceeds the threshold cost. The availability criterion may be configured to determine whether the corresponding robot is capable of performing the relevant portion of the requested task(s) (e.g., the portion requiring capability "C" within a specified time period. For example, if the task request 602 identifies a task for capability "C" is needed immediately, but the corresponding robot is currently performing a task associated with another task request, the DLT client may determine that the corresponding robot is not available and may not generate and transmit the proof of computation.

In an aspect, the DLT client may generate and transmit the proof of computation even when one or more of the criteria would otherwise indicate the proof of computation should not be transmitted and in such instances the proof of computation may propose a condition on the performance of the relevant portion of the requested task(s). For example, if the robot is currently unavailable but could be available in a particular period of time (e.g., 10 minutes, 1 hour, etc.), the proof of computation may be generated and transmitted with a condition that indicates acceptance of the proposed condition. For example, suppose that DLT client 620 transmits a proof of computation for the robot 622 with a condition that indicates the robot 622 is not available for 1 hour and the DLT client 610 selects the robot 622 from among the candidate robots (e.g., because no other proof of computation was received or some other factor). Upon selecting the robot 622, the DLT client 610 may transmit a coalition request (e.g., information indicating the robot 622 has been selected to assist with the task) to the DLT client 620 indicating that the robot 622 has been selected to provide capability "C" in connection with the task(s) requested in the task request 602. In such a scenario the transmission of the coalition request after receiving a conditional proof of computation indicates to DLT client 620 that the condition (e.g., the robot 622 is not available for 1 hour) has been accepted.

It is noted that the specific capabilities and tasks described with reference to FIG. 6 are provided for illustrative purposes only and that robots may have more than three capabilities or less than three capabilities (e.g., a robot may have only 1 capability) depending on the particular robots configured for use in the system. Further, it is noted that while FIG. 6 illustrates a task request as requiring three robot capabilities, tasks may require more than three robot capabilities or less than three robot capabilities in some applications and system deployments. Thus, the exemplary robot capabilities and tasks described with reference to FIG.

6 should be understood as providing non-limiting examples of operations provided by a system configured according to the present disclosure.

Additionally, it is noted that systems according to the present disclosure may include one or more DLT clients that are associated with a facility (e.g., a hospital, a warehouse, etc.) or a portion of a facility (e.g., a department, a practice area, etc.), rather than being associated with one or more robots. In FIG. 6, the DLT client 660 may be associated with a facility, such as a hospital, a warehouse, or another type of facility. DLT clients associated with facilities, such as the DLT client 660, may be configured to receive and process task requests, such as the task request 602, in a manner similar to the processing of the task request 602 described above.

For example, suppose the DLT client 660 is associated with a hospital and receives a task request for services that require capabilities for performing an x-ray of a patient, delivering medication, and taking a patient's vital signs. The task request may indicate that the vital signs should be obtained first (e.g., prior to taking the x-ray or delivering the medication), but that the x-ray and medication tasks may be performed in any order after the vital signs have been captured. The DLT client 660 may utilize a reasoning engine and/or an execution engine to determine a task recipe, needed robot capabilities, and the like, and may communicate with the DLT 650 to coordinate identification of robots suitable for performing the task(s) or sub-tasks in a manner similar to how the DLT client 610 communicated with the DLT 650 to identify a robot having capability "C" above.

Incorporating DLT clients associated with facilities (e.g., DLT client 660), rather than robots may enable more efficient processing of received task requests. For example, facility-based DLT clients may receive incoming task requests from user devices and then may coordinate distribution of tasks to different robot-based DLT clients (e.g., the DLT clients 610, 620, 630, 640) as described above. This may minimize the likelihood that DLT clients associated with robots become strained if there is a high volume of incoming task requests, keeping the robot-based DLT clients free to perform operations for their associated robots. Further, under high-loads, additional facility-based DLT clients may be brought online to provide increased processing capacity without requiring robot-based DLT clients to shoulder the extra load. However, it is noted that in some embodiments, task requests may be received from user devices by both facility-based DLT clients and robot-based DLT clients. For example, the system may be configured to enable some users to submit task requests to robot-based DLT clients directly while other users may submit task requests to a facility-based DLT client or task requests may be distributed to robot-based DLT clients or facility-based DLT clients to balance a current load of incoming task requests. It is noted that the exemplary load-balancing schemes described herein are provided for purposes of illustration, rather than by way of limitation and that other load-balancing mechanisms and system configurations may be used to control distribution of task requests to robot-based DLT clients and facility-based DLT clients.

Figure 7:
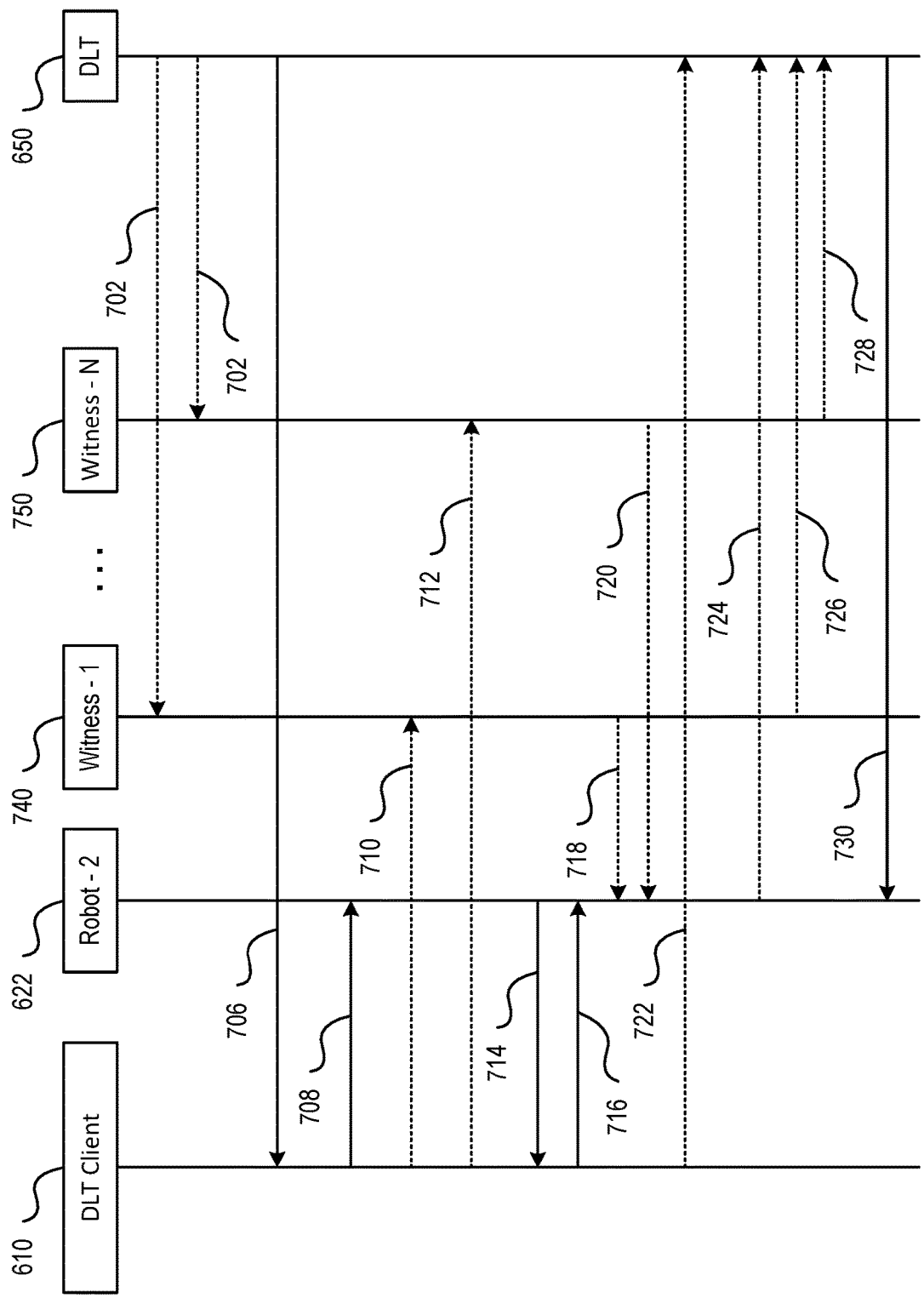
FIG. 7 is a ladder diagram illustrating a process for verification of tasks performed by robots in a system in accordance with embodiments of the present disclosure.

Referring to FIG. 7, a ladder diagram illustrating a process for verification of tasks performed by robots in a system in accordance with embodiments of the present disclosure is shown. In an aspect, the exemplary task illustrated in FIG. 7 may be the illustrative task(s) described with reference to FIGS. 5 and 6 and may be performed by a system, such as the system 100 of FIG. 1. The exemplary process illustrated in FIG. 7 may provide auditable verification of completion of one or more tasks performed via coordination between autonomous robots, as described in more detail below. In FIG. 7, the DLT client 610, the robot 622, and the DLT 650 of FIG. 6 are shown. Additionally, a plurality of witnesses, including a first witness 740 and an Nth witness 750 are shown. It is noted that although FIG. 7 illustrates the plurality of witnesses as including N witnesses, with N=2, this has been provided for purposes of illustration rather than by way of limitation and embodiments where witnesses are identified to provide auditable verification of task completion may utilize more than two witnesses or less than two witnesses depending on the degree of auditable verification the system is configured to provide (e.g., more witnesses may provide a greater degree of trustworthiness with respect to the auditable verification and less witnesses may provide a lesser degree of trustworthiness with respect to the auditable verification but greater degree of trustworthiness than if no witnesses were utilized). In an aspect, the witnesses may be randomly selected or recruited. For example, the DLT 650 may maintain a list of available witnesses and may randomly select one or more of the available witnesses to verify completion of a particular task or tasks within the system. The list of available witnesses may be stored in a witness registry, which may store identity information regarding each of the witnesses.

In aspects, the operations illustrated in FIG. 7 may be initiated by a smart contract, such as the Smart Contract 654 of FIG. 6. For example, the process illustrated in FIG. 7 may be initiated by the smart contract following selection of one or more robots from among the candidate robots by the smart contract (e.g., selection of robot 622 in FIG. 6). As illustrated in FIG. 7, to facilitate the auditable verification the DLT 650 or a process associated with the smart contract may recruit one or more witnesses. To recruit the one or more witnesses, which in FIG. 7 includes the witnesses 740 and 750, information may be transmitted to each of the witnesses, as indicated at 702 and 704. In an aspect, the information transmitted to each of the witnesses 740, 750 may be a new smart contract (e.g., a settlement contract) or an offer to participate in the smart contract as a witness. In an aspect, the information may be transmitted to each of the witnesses prior to transmitting the identity information regarding the selection of robot 622 to the DLT client 610, which is indicated in FIG. 7 at 706.

At 708, the DLT client 610 may transmit information to the selected robot 622 (or the DLT client corresponding to the selected robot) and may transmit, at 710 and 712, information to the witnesses 740, 750, respectively. The information transmitted at 708-712 may serve to synchronize the selected robot 622 and the witnesses 740, 750 so that all involved nodes or parties (e.g., the selected robot 622, the DLT client 610, the robot 612, and the witnesses 740, 750) may monitor or ben monitored during performance of the task(s). For example, the transmitted information may share the ID data for the selected robot 622 with the witnesses 740, 750, thereby enabling the witnesses 740, 750 to monitor the coordinate frame state information associated with the selected robot 622 so as to ensure the completion of the task(s) or sub-task for which the robot 622 was selected. Additionally, the information transmitted, at 708, may put the robot 622 on notice that the witnesses 740, 750 will be monitoring the performance of the task(s) or sub-task by the robot 622, which may help ensure the robot 622 performs the task(s) or sub-task.

The robot 622 may transmit, at 714, information to the DLT client 610 to indicate the start of the task by the robot 622. the DLT client 610 may monitor, at 716, performance of the task by the robot 622. Similarly, the witness 740 may monitor, at 716, performance of the task by the robot 622 and the witness 750 may monitor, at 718, performance of the task by the robot 622. The monitoring process may involve only the robot(s) performing the task and the selected witnesses, and the DLT 650 may compile and store information reported by the witnesses regarding the execution of the task by the selected robot(s). As described above, in some aspects the information compiled from the witnesses may be used as a criteria for robot selection and to improve the overall efficiency at which the system operations, such as by identifying and removing malicious actors (e.g., by not selecting robots identified as poor performers or bad actors for requested tasks, etc.), applying weights to robots identified as reliable or good performers to increase the likelihood that those robots are selected for tasks, and the like. Upon completion of the task performed by the robot 622, the DLT client 610, the robot 622, and the witnesses 740, 750 may transmit information to the DLT 650 and more particularly, the smart contract, to indicate that the task for which the robot 622 was selected has been completed. The smart contract may be configured to provide payment of one or more incentives, such as a payment to the operator of the robot 622, as described above with reference to FIG. 6. Additionally, the payment of the one or more incentives may additionally include payments to the one or more witnesses for monitoring and verifying the performance of the task or sub-task by the robot 622.

In addition to providing for payment of incentives, the system may utilize feedback from the witnesses to provide a reliability rating for the robot 622. If the robot 622 performs the task in a timely fashion, the witnesses may verify the task's successful and timely completion and provide positive feedback to the DLT 650, but if the robot 622 does not perform the task or does not perform the task in a timely fashion, the witnesses may verify the task was not completed in a successful and timely manner and provide negative feedback to the DLT 650. Over time, the system may generate a dynamic rating score that may serve to indicate a reliability or trustworthiness score for the robot 622. In an aspect, the reliability or trustworthiness score may be subsequently used as part of a robot selection process (e.g., to select one or more robots for helping with a future requested task). Additionally or alternatively, the reliability or trustworthiness score may be user to determine whether to continue to allow particular robots to operate within the system. For example, if a robot continues to receive low reliability or trustworthiness ratings the system may remove the robot or designate the robot as unreliable or untrustworthy, which may prevent the system from selecting the robot to assist with tasks or sub-tasks in the future. Compiling the reliability or trustworthiness ratings may provide a way to incentivize robots to operate in a manner that promotes efficient operation of the system and enhance the operations of the system by ensuring that tasks or sub-tasks are completed in an automated and timely fashion.

Figure 8:
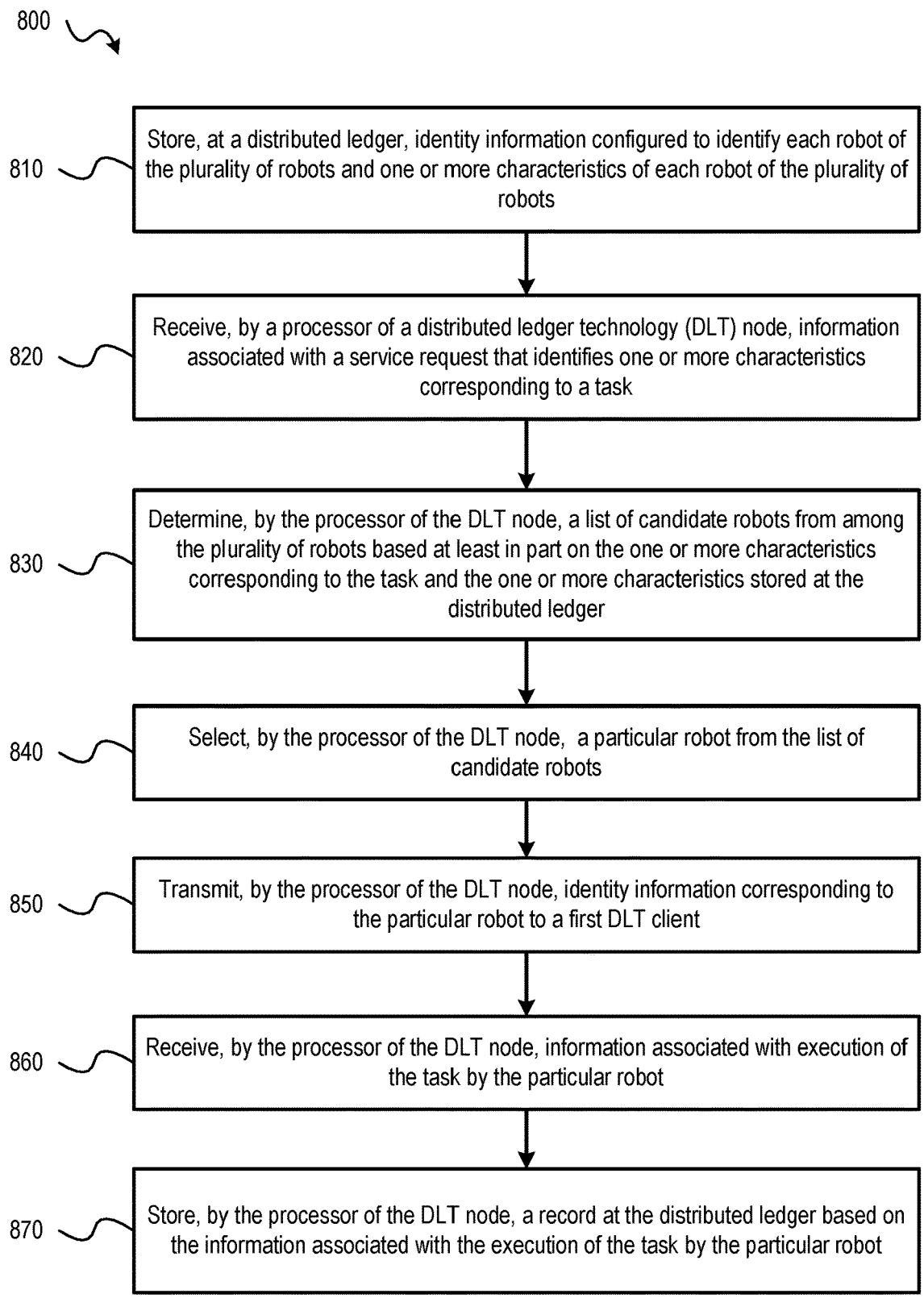
FIG. 8 is a flow diagram of a method for providing decentralized control of robotic agents in accordance with embodiments of the present disclosure.

Referring to FIG. 8, a flow diagram of an exemplary method for providing decentralized control of a plurality of robots is shown as a method 800. In an aspect, the method 800 may be provided by a system, such as the system 100 of FIG. 1. One or more steps of the method 800 may be stored as instructions (e.g., the instructions 146 of FIG. 1, the instructions 222 of FIG. 2, the instructions 322 of FIG. 3, or the instructions 422 of FIG. 4) that, when executed by one or more processors (e.g., the one or more processors 142 of FIG. 1, the one or more processors 210 of FIG. 2, the one or more processors 310 of FIG. 3, or the one or more processors 410 of FIG. 4), cause the one or more processors to perform one or more steps of the method 800.

As shown in FIG. 8, the method 800 includes, at step 810, storing, at a distributed ledger, identity information configured to identify each robot of the plurality of robots and one or more characteristics of each robot of the plurality of robots. The identity information may include a DID for each robot, as described above, and the characteristics may indicate one or more of hardware and capabilities for each robot, as described above with reference to FIGS. 1 and 5-7. At step 820, the method 800 includes receiving, by a processor of a distributed ledger technology (DLT) node, information associated with a service request that identifies one or more characteristics corresponding to a task. In an aspect, the DLT node may be the DLT node 120 of FIG. 1 or the DLT node 400 of FIG. 4, and the information associated with the service request may be received in a manner similar to the service request 602 of FIG. 6. The service request may be generated by a requestor device (e.g., the requestor device 160 of FIG. 1). It is noted that in some aspects, the service request may be received by a DLT client (e.g., DLT client 154 of FIG. 1 or DLT client 610 of FIG. 6) instead of at the DLT node, as described with reference to FIG. 6 where DLT client 610 receives the service request 602. In such aspects, the DLT client may provide a service request to the DLT node, where the service request may request assistance with one or more tasks that cannot be performed by a robot corresponding to the DLT client.

At step 830, the method 800 includes determining, by the processor of the DLT node, a list of candidate robots from among the plurality of robots based at least in part on the one or more characteristics corresponding to the task and the one or more characteristics stored at the distributed ledger. As described above with reference to FIGS. 5 and 6, the list of candidate robots may identify at least one robot of the plurality of robots having at least one of the one or more characteristics corresponding to the task. It is noted that the task for which the list of candidate robots are identified may be one of many tasks to be performed. For example, other tasks may be performed by one or more robots that have the relevant characteristics (e.g., relevant to the other tasks) and that are controlled or owned by a DLT client receiving the service request from a requestor device (e.g., the requestor device 160 of FIG. 1).

At step 840, the method 800 includes selecting, by the processor of the DLT node, a particular robot from the list of candidate robots. As described above with reference to FIGS. 5 and 6, the selection of a particular robot from the list of candidate robots may involve issuing a challenge to at least one DLT client, such as a DLT client associated with one of the candidate robots. Upon receiving the challenge, the robot (or its associated DLT client) may generate a proof of computation, as described above with reference to FIGS. 5 and 6, and the proof of computation may be transmitted to the DLT node by the DLT client. The DLT node may receive the proof of computation from some, but not necessarily all DLT clients of the candidate robots. The proof of computation may be derived from the challenge issued by the DLT node and the particular robot may be selected from the list of candidate robots based at least in part on the proof of computations. For example, the DLT node may generate a score based on the proof of computation and the particular robot may be selected based on the score, as described above.

At step 850, the method 800 includes transmitting, by the processor of the DLT node, identity information corresponding to the particular robot to a first DLT client. Transmission of the identity information to the first DLT client may indicate that the particular robot has been selected to perform the task identified by the service request. The method 800 includes, at step 860, receiving, by the processor of the DLT node, information associated with execution of the task by the particular robot. As described above, the robots may store state information (e.g., SRDF data and/or URDF data), which may be dynamically updated in real-time based on movement of each robot of the plurality of robots. The state data may be monitored to verify the particular robot performs the task it was selected to perform. In an aspect, verification that the selected task is performed by the particular robot may be based, at least in part, on information received from one or more witness nodes. For example, the DLT node may identify one or more witness nodes, which may be configured with functionality that enables the witness nodes to monitor state information corresponding to the particular robot. The DLT node may provide a notification to each of the one or more witness nodes that includes information identifying the particular robot that is to perform the task. Upon receiving the notification, the witness nodes may monitor the state information corresponding to the particular robot and determine whether the particular robot completed the task based on the monitoring of the state information. The witness nodes may transmit verification information to the DLT, where the verification information indicates whether the particular robot completed the task. The verification information may be stored as one or more records on the distributed ledger. Additional exemplary aspects of selecting and using witness nodes to verify completion of a task by a selected robot are described above with reference to FIG. 7.

The method 800 also includes, at step 870, storing, by the processor of the DLT node, a record at the distributed ledger based on the information associated with the execution of the task by the particular robot. In an aspect, the plurality of robots may be owned by different entities and the robots may operate cooperatively to perform various tasks. For example, as described with reference to FIG. 6, a DLT client may receive a service request and a robot corresponding to the DLT client may possess characteristics suitable for performing one or more tasks indicated by the service request. When one or more tasks cannot be achieved by robots corresponding to the DLT client, the service request (or a modified service request identifying the tasks for which additional characteristics are need) may be provided to the DLT node (e.g., as described above with reference to step 810. The method 800 may identify a second robot (e.g., the particular robot referenced in describing the method 800) that is to assist the robot(s) corresponding to the DLT client in accomplishing all tasks indicated by the service request received by the DLT client. As described herein, the various validation and verification processes (e.g., the use of a distributed ledger, witnesses, proof of computation, state data monitoring, and the like) provided by the method 800 facilitate an automated system for coordinating actions performed by different robots to achieve a common goal (e.g., accomplish the tasks indicated by a service request). Additionally, the various verification and validation processes ensure that the system operates in a trustworthy manner and mitigates instances where a bad actor may disrupt system operations. Furthermore, because the method 800 facilitates distributed and decentralized control over the robots, the system may be resilient to failure (e.g., due to the redundant capabilities provided by the DLT clients and DLT nodes). Thus, the method 800 provides several advantages over previous systems that provided a centralized way to control robots.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-4) may comprise processors, electronics devices, hardware devices, electronics components, logical circuits, memories, software codes, firmware codes, etc., or any combination thereof. In addition, features discussed herein relating to FIGS. 1-4 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIG. 8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for providing decentralized control of a plurality of robots, the system comprising:
   a distributed ledger configured to store identity information configured to identify each robot of the plurality of robots and one or more characteristics of each robot of the plurality of robots;
   a distributed ledger technology (DLT) node comprising a memory and one or more processors communicatively coupled to the memory, the one or more processors configured to:
     receive information associated with a service request that identifies one or more characteristics corresponding to a task;
     determine a list of candidate robots from among the plurality of robots based at least in part on the one or more characteristics corresponding to the task and the one or more characteristics stored at the distributed ledger, wherein the list of candidate robots identifies at least one robot of the plurality of robots having at least one of the one or more characteristics corresponding to the task;
     select a particular robot from the list of candidate robots;
     transmit identity information corresponding to the particular robot to a first DLT client, wherein transmission of the identity information to the first DLT client indicates that the particular robot is to perform the task identified by the service request;
     receive information associated with execution of the task by the particular robot; and
     store a record at the distributed ledger based on the information associated with the execution of the task by the particular robot.

2. The system of claim 1, wherein the one or more processors are configured to:
   issue a challenge to at least one DLT client based on the list of candidate robots, wherein the at least one DLT client is associated with the at least one robot identified in the list of candidate robots, wherein the first DLT client is different from the at least one DLT client; and
   receive a proof of computation from the at least one DLT client, wherein the proof of computation is derived from the challenge issued by the DLT node, wherein the particular robot is selected from the list of candidate robots based at least in part on the proof of computation received from the at least one DLT client.

3. The system of claim 2, wherein the one or more processors are configured to generate a score based on the proof of computation, and wherein the particular robot is selected based on the score.

4. The system of claim 1, wherein the distributed ledger is maintained on a public blockchain, a private blockchain, a distributed database, or a distributed database and blockchain.

5. The system of claim 1, wherein the one or more characteristics of each robot of the plurality of robots identify one or more capabilities of each robot of the plurality of robots, and wherein different capabilities correspond to different types of tasks.

6. The system of claim 1, wherein the distributed ledger is configured to store a master smart contract, and wherein the one or more processors are configured to create an instance of a master smart contract based on the services request.

7. The system of claim 6, wherein the instance of the master smart contract is configured to evaluate the one or more characteristics of each robot of the plurality of robots against the one or more characteristics corresponding to the task to generate the list of candidate robots.

8. The system of claim 1, further comprising:
   a database configured to store state information associated with each robot of the plurality of robots, wherein the state information is dynamically updated as each of the robots moves; and
   wherein the one or more processors are configured to:
     identify one or more witness nodes, each of the one or more witness nodes configured to monitor state information corresponding to the particular robot;
     provide a notification to each of the one or more witness nodes, the notification comprising information that identifies the particular robot that is to perform the task; and
     receive verification information from each of the one or more witness nodes, wherein the verification information indicates whether the particular robot completed the task, and wherein the verification information is determined based on monitoring the state information stored at the database.

9. The system of claim 1, wherein the plurality of robots are owned by different entities.

10. The system of claim 9, wherein the service request is associated with a second task, and wherein the second task is performed by a robot of the plurality of robots that is different from the particular robot, and wherein the robot is owned by a first entity of the different entities and the particular robot is owned by a second entity of the different entities.

11. A method for providing decentralized control of a plurality of robots, the method comprising:
   storing, at a distributed ledger, identity information configured to identify each robot of the plurality of robots and one or more characteristics of each robot of the plurality of robots;
   receiving, by a processor of a distributed ledger technology (DLT) node, information associated with a service request that identifies one or more characteristics corresponding to a task;
   determining, by the processor of the DLT node, a list of candidate robots from among the plurality of robots based at least in part on the one or more characteristics corresponding to the task and the one or more characteristics stored at the distributed ledger, wherein the list of candidate robots identifies at least one robot of the plurality of robots having at least one of the one or more characteristics corresponding to the task;
   selecting, by the processor of the DLT node, a particular robot from the list of candidate robots;
   transmitting, by the processor of the DLT node, identity information corresponding to the particular robot to a first DLT client, wherein transmission of the identity information to the first DLT client indicates that the particular robot is to perform the task identified by the service request;
   receiving, by the processor of the DLT node, information associated with execution of the task by the particular robot; and storing, by the processor of the DLT node, a record at the distributed ledger based on the information associated with the execution of the task by the particular robot.

12. The method of claim 11, wherein selecting the particular robot comprises:
issuing a challenge to at least one DLT client based on the list of candidate robots, wherein the at least one DLT client is associated with the at least one robot identified in the list of candidate robots, wherein the first DLT client is different from the at least one DLT client;
receiving a proof of computation from the at least one DLT client, wherein the proof of computation is derived from the challenge issued by the DLT node, wherein the particular robot is selected from the list of candidate robots based at least in part on the proof of computation received from the at least one DLT client; and
generating a score based on the proof of computation, and wherein the particular robot is selected based on the score.

13. The method of claim 12, wherein the one or more characteristics of each robot of the plurality of robots identify one or more capabilities of each robot of the plurality of robots, and wherein different capabilities correspond to different types of tasks.

14. The method of claim 11, further comprising:
storing, at a database, state information associated with each robot of the plurality of robots;
dynamically updating the state information based on real-time movement of each robot of the plurality of robots;
identifying one or more witness nodes, each of the one or more witness nodes configured to monitor state information corresponding to the particular robot;
providing a notification to each of the one or more witness nodes, the notification comprising information that identifies the particular robot that is to perform the task; and
receiving verification information from each of the one or more witness nodes, wherein the verification information indicates whether the particular robot completed the task, and wherein the verification information is determined based on monitoring the state information stored at the database.

15. The method of claim 11, wherein the plurality of robots are owned by different entities, wherein the service request is associated with a second task, wherein the second task is performed by a robot of the plurality of robots that is different from the particular robot, and wherein the robot is owned by a first entity of the different entities and the particular robot is owned by a second entity of the different entities.

16. A non-transitory computer-readable storage medium storing instructions that, when executed by one or more processors, cause the one or more processors to perform operations for providing decentralized control of a plurality of robots, the operations comprising:
storing, at a distributed ledger, identity information configured to identify each robot of the plurality of robots and one or more characteristics of each robot of the plurality of robots;
receiving information associated with a service request that identifies one or more characteristics corresponding to a task;
determining a list of candidate robots from among the plurality of robots based at least in part on the one or more characteristics corresponding to the task and the one or more characteristics stored at the distributed ledger, wherein the list of candidate robots identifies at least one robot of the plurality of robots having at least one of the one or more characteristics corresponding to the task;
selecting a particular robot from the list of candidate robots;
transmitting identity information corresponding to the particular robot to a first distributed ledger technology (DLT) client, wherein transmission of the identity information to the first DLT client indicates that the particular robot is to perform the task identified by the service request;
receiving information associated with execution of the task by the particular robot; and
storing a record at the distributed ledger based on the information associated with the execution of the task by the particular robot, wherein the record is configured to indicate whether the task was successfully executed by the particular robot.

17. The non-transitory computer-readable storage medium of claim 16, wherein selecting the particular robot comprises:
issuing a challenge to at least one DLT client based on the list of candidate robots, wherein the at least one DLT client is associated with the at least one robot identified in the list of candidate robots, wherein the first DLT client is different from the at least one DLT client;
receiving a proof of computation from the at least one DLT client, wherein the proof of computation is derived from the issued challenge, wherein the particular robot is selected from the list of candidate robots based at least in part on the proof of computation received from the at least one DLT client; and
generating a score based on the proof of computation, and wherein the particular robot is selected based on the score.

18. The non-transitory computer-readable storage medium of claim 16, wherein the one or more characteristics of each robot of the plurality of robots identify one or more capabilities of each robot of the plurality of robots, and wherein different capabilities correspond to different types of tasks.

19. The non-transitory computer-readable storage medium of claim 16, further comprising:
storing, at a database, state information associated with each robot of the plurality of robots; and
dynamically updating the state information based on real-time movement of each robot of the plurality of robots, wherein a determination of whether the task was successfully executed by the particular robot is based at least in part on the state information.

20. The non-transitory computer-readable storage medium of claim 19, further comprising:
identifying one or more witness nodes, each of the one or more witness nodes configured to monitor state information corresponding to the particular robot;
providing a notification to each of the one or more witness nodes, the notification comprising information that identifies the particular robot that is to perform the task; and
receiving verification information from each of the one or more witness nodes, wherein the verification information indicates whether the task was successfully executed by the particular robot, and wherein the verification information is determined by the one or more witness nodes based on the state information stored at the database.

\* \* \* \* \*

UNITED STATES PATENT AND TRADEMARK OFFICE
CERTIFICATE OF CORRECTION

PATENT NO. : 11,579,630 B2
APPLICATION NO. : 16/784139
DATED : February 14, 2023
INVENTOR(S) : Hugo Borne-Pons et al.

It is certified that error appears in the above-identified patent and that said Letters Patent is hereby corrected as shown below:

In the Specification

Column 20, Line 61, delete the portion of the equation reading "$(X_{11} + (X_{21}-X_{22})$" and replace with --$(X_{11}-X_e)*A_e + (X_{21}-X_{22})$--.
Column 22, Line 23, delete "capability "C" within" and replace with --capability "C") within--.

Signed and Sealed this
Eleventh Day of April, 2023

Katherine Kelly Vidal
*Director of the United States Patent and Trademark Office*